US011574335B2

(12) United States Patent
Joseph et al.

(10) Patent No.: US 11,574,335 B2
(45) Date of Patent: Feb. 7, 2023

(54) APPARATUS AND METHOD FOR UTILIZING IMMEDIATE GRATIFICATION PROMOTIONS

(71) Applicant: Groupon, Inc., Chicago, IL (US)

(72) Inventors: Anthony Joseph, Bellevue, WA (US); Gregory J. Conklin, San Francisco, CA (US); Vinayak Hegde, Bellevue, WA (US); David Fite, Seattle, WA (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 17/116,871

(22) Filed: Dec. 9, 2020

(65) Prior Publication Data

US 2021/0166261 A1 Jun. 3, 2021

Related U.S. Application Data

(63) Continuation of application No. 16/682,031, filed on Nov. 13, 2019, now Pat. No. 10,929,868, which is a
(Continued)

(51) Int. Cl.
*G06Q 30/00* (2012.01)
*G06Q 30/02* (2012.01)

(52) U.S. Cl.
CPC ..... *G06Q 30/0235* (2013.01); *G06Q 30/0238* (2013.01); *G06Q 30/0261* (2013.01); *G06Q 30/0267* (2013.01)

(58) Field of Classification Search
None
See application file for complete search history.

(56) References Cited

U.S. PATENT DOCUMENTS

| 5,909,189 A | 6/1999 | Blackman et al. |
| 6,154,745 A * | 11/2000 | Kari ............ H04W 4/02 707/769 |

(Continued)

OTHER PUBLICATIONS

Hristova, Nataliya and O'Hare, G.M.P. "Ad-me: Wireless Advertising Adapted to User Location, Device, and Emotions." Hawaii International Conference on System Sciences, IEEE, 2004. (Year: 2004).*

(Continued)

*Primary Examiner* — Luis A Brown
(74) *Attorney, Agent, or Firm* — Alston & Bird LLP

(57) ABSTRACT

An apparatus, computer program product, and method are disclosed for generating immediate gratification promotions. An example apparatus includes communications circuitry configured to receive contextual data regarding a set of consumer devices, wherein the contextual data identifies locations of each consumer device of the set of consumer devices, receive resource management data regarding a set of merchant locations, transmit, to a consumer device of the set of consumer devices, a message indicating terms of an immediate gratification promotion redeemable at a merchant location of the set of merchant locations, wherein the immediate gratification promotion comprises a promotion for which purchase automatically initiates redemption, and receive, from the consumer device, a message requesting purchase of the immediate gratification promotion. The example apparatus further includes design circuitry configured to generate the terms of the immediate gratification promotion based on the received contextual data and the received resource management data.

20 Claims, 9 Drawing Sheets

Related U.S. Application Data continuation of application No. 15/174,164, filed on Jun. 6, 2016, now Pat. No. 10,521,815.

(60) Provisional application No. 62/171,576, filed on Jun. 5, 2015.

(56) References Cited

U.S. PATENT DOCUMENTS

| | | | |
|---|---|---|---|
| 6,202,023 B1* | 3/2001 | Hancock | H04L 67/30 |
| | | | 707/E17.11 |
| 6,219,614 B1* | 4/2001 | Uchigaki | G01C 21/3632 |
| | | | 701/428 |
| 6,252,544 B1* | 6/2001 | Hoffberg | H04B 7/18576 |
| | | | 701/445 |
| 6,253,069 B1* | 6/2001 | Mankovitz | H04M 3/487 |
| | | | 379/93.12 |
| 6,332,127 B1* | 12/2001 | Bandera | G06Q 30/0257 |
| | | | 705/14.55 |
| 6,353,398 B1* | 3/2002 | Amin | G06Q 30/0261 |
| | | | 340/988 |
| 6,360,167 B1* | 3/2002 | Millington | G01C 21/26 |
| | | | 342/357.34 |
| 6,381,603 B1* | 4/2002 | Chan | G06F 16/9537 |
| | | | 707/999.005 |
| 6,421,675 B1* | 7/2002 | Ryan | G06F 16/951 |
| 6,429,813 B2* | 8/2002 | Feigen | G09B 29/102 |
| | | | 701/414 |
| 6,571,279 B1* | 5/2003 | Herz | G06F 16/9535 |
| | | | 709/219 |
| 6,647,257 B2* | 11/2003 | Owensby | H04L 67/535 |
| | | | 455/414.1 |
| 6,647,414 B1* | 11/2003 | Eriksson | G06Q 30/0277 |
| | | | 709/227 |
| 6,741,188 B1* | 5/2004 | Miller | G06Q 30/0261 |
| | | | 340/539.13 |
| 7,136,875 B2* | 11/2006 | Anderson | G06F 16/24537 |
| 7,177,623 B2 | 2/2007 | Baldwin | |
| 7,246,109 B1* | 7/2007 | Ramaswamy | G06F 16/9537 |
| 7,561,169 B2* | 7/2009 | Carroll | G06T 17/05 |
| | | | 701/4 |
| 8,284,748 B2 | 10/2012 | Borghei | |
| 8,521,131 B1* | 8/2013 | Ramalingam | G06Q 10/00 |
| | | | 455/410 |
| 8,777,754 B1* | 7/2014 | Santini | G07F 17/326 |
| | | | 705/80 |
| 9,143,601 B2* | 9/2015 | Padmanabhan | H04W 4/02 |
| 9,158,974 B1 | 10/2015 | Laska et al. | |
| 9,560,426 B1* | 1/2017 | Daniel | H04L 67/04 |
| 9,609,577 B1 | 3/2017 | Ramalingam et al. | |
| 9,648,056 B1* | 5/2017 | Kim | G06Q 30/0261 |
| 9,940,635 B1 | 4/2018 | Shariff et al. | |
| 10,057,115 B2 | 8/2018 | Baca | H04L 41/0886 |
| 10,129,694 B1* | 11/2018 | Parshin | H04W 4/025 |
| 10,210,548 B1* | 2/2019 | Wai | G06Q 30/0247 |
| 10,438,240 B1* | 10/2019 | Ehrlacher | G06Q 30/0261 |
| 10,521,815 B1 | 12/2019 | Joseph et al. | |
| 10,523,625 B1* | 12/2019 | Allen | H04L 51/52 |
| 10,535,076 B1* | 1/2020 | Thacker | G06Q 30/0251 |
| 10,687,167 B1* | 6/2020 | Joseph | G01C 21/3476 |
| 10,929,868 B2* | 2/2021 | Joseph | G06Q 30/0267 |
| 11,062,348 B1* | 7/2021 | Thacker | G06Q 30/0243 |
| 2002/0046084 A1* | 4/2002 | Steele | H04L 67/306 |
| | | | 705/14.64 |
| 2002/0065068 A1* | 5/2002 | Nobukiyo | H04M 3/493 |
| | | | 455/414.2 |
| 2002/0095333 A1* | 7/2002 | Jokinen | G06Q 30/0269 |
| | | | 705/14.66 |
| 2002/0103892 A1* | 8/2002 | Rieger, III | H04L 51/222 |
| | | | 709/223 |
| 2002/0120629 A1 | 8/2002 | Leonard | |
| 2002/0128903 A1* | 9/2002 | Kernahan | G06Q 30/02 |
| | | | 705/14.69 |
| 2002/0164977 A1* | 11/2002 | Link, II | G06Q 30/02 |
| | | | 455/414.1 |
| 2003/0014213 A1 | 1/2003 | Yokota | |
| 2003/0065565 A1 | 4/2003 | Wagner et al. | |
| 2003/0065595 A1* | 4/2003 | Anglum | G06Q 40/00 |
| | | | 705/35 |
| 2004/0006425 A1* | 1/2004 | Wood | G09B 29/10 |
| | | | 701/532 |
| 2004/0133446 A1 | 7/2004 | Myrick et al. | |
| 2004/0210386 A1* | 10/2004 | Wood | G09B 29/10 |
| | | | 701/532 |
| 2004/0254723 A1* | 12/2004 | Tu | G01C 21/3679 |
| | | | 701/410 |
| 2004/0254861 A1 | 12/2004 | Pentel | |
| 2005/0209921 A1* | 9/2005 | Roberts | G06Q 30/0211 |
| | | | 705/14.35 |
| 2005/0261822 A1* | 11/2005 | Wako | G01C 21/3682 |
| | | | 701/438 |
| 2005/0288959 A1* | 12/2005 | Eraker | G06Q 30/0603 |
| | | | 709/202 |
| 2006/0026067 A1 | 2/2006 | Nicholas et al. | |
| 2006/0161475 A1 | 7/2006 | Redford et al. | |
| 2006/0178932 A1* | 8/2006 | Lang | G06Q 30/0277 |
| | | | 705/14.73 |
| 2006/0238379 A1* | 10/2006 | Kimchi | G06F 16/29 |
| | | | 340/995.1 |
| 2007/0208616 A1* | 9/2007 | Choi | G06Q 30/0277 |
| | | | 705/14.55 |
| 2008/0021637 A1* | 1/2008 | Staton | G07C 9/28 |
| | | | 701/408 |
| 2008/0153487 A1* | 6/2008 | Martin | H04W 4/02 |
| | | | 455/435.1 |
| 2008/0270163 A1 | 10/2008 | Green | |
| 2009/0070220 A1 | 3/2009 | Gross | |
| 2010/0130226 A1* | 5/2010 | Arrasvuori | H04W 4/029 |
| | | | 455/456.1 |
| 2011/0029385 A1* | 2/2011 | Engel | H04M 15/00 |
| | | | 345/173 |
| 2011/0112892 A1* | 5/2011 | Tarantino | G07F 17/32 |
| | | | 705/14.1 |
| 2011/0238517 A1 | 9/2011 | Ramalingam et al. | |
| 2011/0276393 A1* | 11/2011 | Srinivasan | G06Q 30/0241 |
| | | | 707/769 |
| 2011/0320715 A1* | 12/2011 | Ickman | G06Q 30/02 |
| | | | 711/E12.017 |
| 2012/0030048 A1* | 2/2012 | Manley | G06Q 30/0641 |
| | | | 705/26.1 |
| 2012/0035997 A1 | 2/2012 | Burgess et al. | |
| 2012/0088523 A1* | 4/2012 | Shirakawa | H04L 67/52 |
| | | | 455/456.3 |
| 2012/0310527 A1 | 12/2012 | Yariv et al. | |
| 2013/0021174 A1* | 1/2013 | Silzer, Sr. | G05D 1/0278 |
| | | | 701/34.4 |
| 2013/0091452 A1 | 4/2013 | Sorden et al. | |
| 2013/0117365 A1* | 5/2013 | Padmanabhan | H04L 67/10 |
| | | | 709/204 |
| 2013/0129060 A1 | 5/2013 | Gopalakrishnan et al. | |
| 2013/0198281 A1 | 8/2013 | Scuba et al. | |
| 2013/0218682 A1* | 8/2013 | Alterman | G06Q 10/00 |
| | | | 705/14.58 |
| 2013/0225196 A1* | 8/2013 | James | H04W 4/022 |
| | | | 455/456.1 |
| 2013/0275192 A1* | 10/2013 | Aissa | G06Q 30/0226 |
| | | | 705/14.15 |
| 2013/0282490 A1 | 10/2013 | Kramer et al. | |
| 2013/0304488 A1 | 11/2013 | Girao et al. | |
| 2014/0040068 A1 | 2/2014 | Mohan et al. | |
| 2014/0073362 A1* | 3/2014 | Kawata | G06Q 50/01 |
| | | | 455/456.3 |
| 2014/0087780 A1 | 3/2014 | Abhyanker et al. | |
| 2014/0100945 A1* | 4/2014 | Kitts | G06Q 30/0241 |
| | | | 705/14.42 |
| 2014/0114866 A1 | 4/2014 | Abhyanker | |
| 2014/0129337 A1* | 5/2014 | Otremba | G06Q 30/0261 |
| | | | 705/14.58 |
| 2014/0171099 A1* | 6/2014 | Sydir | H04W 4/021 |
| | | | 455/456.1 |

(56) References Cited

U.S. PATENT DOCUMENTS

| | | | |
|---|---|---|---|
| 2014/0180790 A1* | 6/2014 | Boal | G06Q 30/0245 705/14.42 |
| 2014/0199961 A1* | 7/2014 | Mohammed | H04M 15/61 455/406 |
| 2014/0214465 A1* | 7/2014 | L'Heureux | G06Q 10/08 705/7.13 |
| 2014/0257877 A1 | 9/2014 | L'Heureux et al. | |
| 2014/0358673 A1* | 12/2014 | Sim | G06Q 30/0246 705/14.45 |
| 2015/0031388 A1 | 1/2015 | Chatterjee et al. | |
| 2015/0058941 A1 | 2/2015 | Lyman et al. | |
| 2015/0088651 A1 | 3/2015 | Geiger | |
| 2015/0095355 A1 | 4/2015 | Patton | |
| 2015/0120405 A1* | 4/2015 | Kavana | G06Q 30/0252 705/14.5 |
| 2015/0120453 A1 | 4/2015 | Lee et al. | |
| 2015/0148060 A1 | 5/2015 | Parab et al. | |
| 2015/0169629 A1 | 6/2015 | Van et al. | |
| 2015/0181303 A1* | 6/2015 | Amano | H04N 21/422 725/34 |
| 2015/0213357 A1* | 7/2015 | Gomez-Rosado | G06Q 30/0631 706/46 |
| 2015/0269608 A1* | 9/2015 | Kimura | G06Q 30/0244 705/14.43 |
| 2015/0294335 A1* | 10/2015 | Hu | G06Q 20/384 705/39 |
| 2015/0302456 A1* | 10/2015 | Rego | G06Q 30/0235 705/14.35 |
| 2015/0341999 A1 | 11/2015 | Qiao et al. | |
| 2015/0365794 A1 | 12/2015 | Hardwick et al. | |
| 2016/0005280 A1 | 1/2016 | Laska et al. | |
| 2016/0005281 A1 | 1/2016 | Laska et al. | |
| 2016/0027056 A1* | 1/2016 | Taslimi | G06Q 30/0277 705/14.45 |
| 2016/0155088 A1* | 6/2016 | Pylappan | G06Q 10/0836 705/333 |
| 2016/0180476 A1 | 6/2016 | Talwar | |
| 2016/0188596 A1* | 6/2016 | Keggi | G06F 16/9535 703/11 |
| 2016/0203506 A1 | 7/2016 | Butler et al. | |
| 2016/0307151 A1 | 10/2016 | Grabovski et al. | |
| 2016/0314429 A1 | 10/2016 | Gillen et al. | |
| 2016/0343027 A1 | 11/2016 | Cheng et al. | |
| 2017/0024682 A1 | 1/2017 | Piccionelli | |
| 2017/0032416 A1* | 2/2017 | Soni | G06Q 30/0254 |
| 2017/0034659 A1* | 2/2017 | Shnitzer | G06Q 30/02 |
| 2018/0225687 A1* | 8/2018 | Ahmed | H04W 4/021 |
| 2019/0035241 A1 | 1/2019 | Laska et al. | |
| 2019/0340876 A1* | 11/2019 | Northrup | G07F 17/3241 |

OTHER PUBLICATIONS

U.S. Appl. No. 16/682,031, filed Nov. 13, 2019, U.S. Pat. No. 10,929,868.

U.S. Appl. No. 15/174,164, filed Jun. 6, 2016, U.S. Pat. No. 10,521,815.

Hristova; Ad-me_ wireless advertising adapted to the user location, device and emotions; Conf on Sys Sciences 2004; pp. 1-10; 2004.

Kartik; Deal or No deal_ Catering to user preferences; Pervasive Computing and Communication; pp. 199-202; 2014.

U.S. Application as filed Jun. 6, 2016, U.S. Appl. No. 15/174,173.

U.S. Application filed on Jun. 6, 2016, U.S. Appl. No. 15/174,156.

* cited by examiner

Privacy Settings

○ Always On?
   Enter Active Times of Day: [    ]

○ Gather Data From Other Apps?
○ Allow Location Sharing?
Other Sensors:
   ○ Microphone
   ○ Temperature
   ○ Humidity
   ⋮
   ○ Allow All

[ Accept ]

FIG. 2A

▲ Product [ 2 ] Of 4 ▼

Product/Service ID: [        ]

Promotion Threshold:
5% Discount
10% Discount
15% Discount
20% Discount
25% Discount
▼

[ Accept ]

FIG. 2B

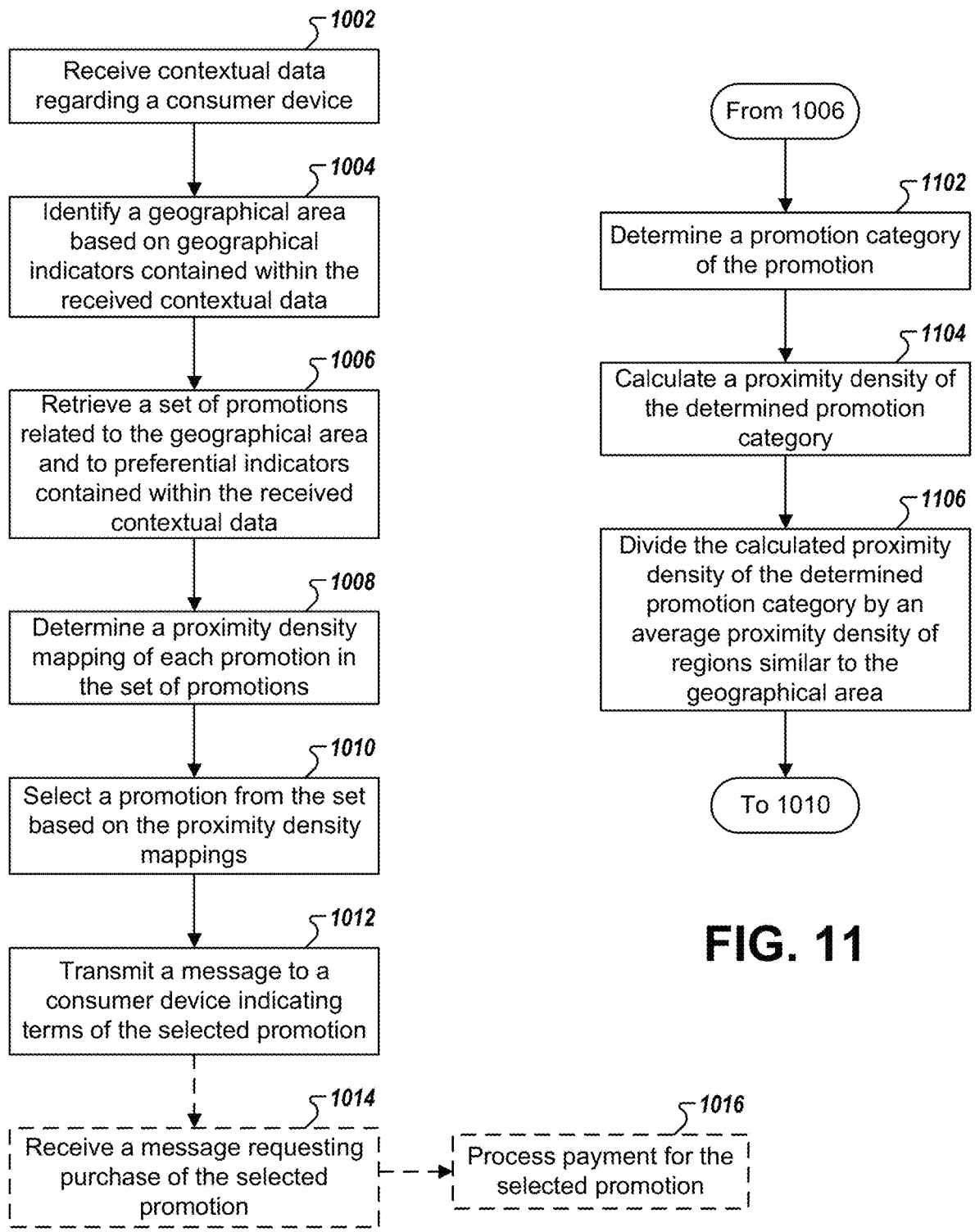

APPARATUS AND METHOD FOR UTILIZING IMMEDIATE GRATIFICATION PROMOTIONS

CROSS-REFERENCE TO RELATED APPLICATIONS

The present application is a continuation of U.S. application Ser. No. 16/682,031, filed Nov. 13, 2019, which is a continuation of U.S. application Ser. No. 15/174,164, filed Jun. 6, 2016 (now U.S. Pat. No. 10,521,815), which claims the benefit of U.S. Provisional Patent Application No. 62/171,576, filed Jun. 5, 2015, the contents of which are each incorporated by reference herein in their entirety.

TECHNOLOGICAL FIELD

Example embodiments of the present invention relate generally to near real-time device interactions and, more particularly, to a system and method by which contextual data can be utilized to improve the relevance of man-machine interaction.

BACKGROUND

Applicant has discovered problems with existing mechanisms for identifying the real-time desires of a user population. Through applied effort, ingenuity, and innovation, Applicant has solved many of these identified problems by developing a solution that is embodied by the present invention and described in detail below.

BRIEF SUMMARY

A system is provided that improves upon existing mechanisms for identifying products and services to offer to consumers. In an example embodiment, a promotion and marketing service automatically interacts with consumer devices and merchant devices to identify contextually relevant products and/or services. Using this information, particularly relevant promotions can thereafter be generated and provided to consumers. Additionally, based on this contextual data, immediate gratification promotions, which can be both purchased and redeemed by a consumer with a single message, can be generated that are highly relevant and easy for consumers to use. Accordingly, embodiments described herein improve upon traditional mechanisms for promoting products and services to a user population.

In a first example embodiment, an apparatus is provided. The apparatus includes communications circuitry configured to receive contextual data regarding a set of consumer devices, wherein the contextual data regarding the set of consumer devices at least identifies locations of each consumer device of the set of consumer devices, and receive resource management data regarding a set of merchant locations. The communications circuitry is further configured to transmit, to a consumer device of the set of consumer devices, a message indicating terms of an immediate gratification promotion redeemable at a merchant location of the set of merchant locations, wherein the immediate gratification promotion comprises a promotion for which purchase automatically initiates redemption, and receive, from the consumer device, a message requesting purchase of the immediate gratification promotion. The apparatus further includes design circuitry configured to generate the terms of the immediate gratification promotion based on the received contextual data and the received resource management data.

In some embodiments, the contextual data regarding the set of consumer devices includes at least one of location, velocity, acceleration, angular velocity, direction-of-travel, mode of travel, temperature, humidity, brightness, gravity, orientation, proximity, recorded audio, time of day, day of the week, seasons, country identification, behavioral history, or one or more predefined consumer preferences.

In some embodiments, the resource management data regarding the set of merchant locations includes at least one of: product inventory at the merchant location; identification or quantification of fixed, perishable resources at the merchant location; or one or more discount thresholds regarding one or more products or services offered for sale at the merchant location.

In some embodiments, the design circuitry is configured to identify the consumer device and the merchant location prior to generating the terms of the immediate gratification promotion.

In some such embodiments, the design circuitry may be configured to identify the consumer device and the merchant location by determining a physical region associated with each particular merchant location of the set of merchant locations that indicates an area within which consumers are likely to purchase immediate gratification promotions redeemable at that particular merchant location, establishing a geo-fence associated with each merchant location of the set of merchant locations, wherein each geo-fence comprises a virtual perimeter enclosing the determined physical region associated with a corresponding merchant location, identifying, from the received contextual data, a subset of consumer devices that are located within the geo-fence associated with the merchant location, and selecting the consumer device from the subset of consumer devices that are located within the geo-fence. In one such embodiment, determining the physical region around the merchant location within which consumers are likely to purchase immediate gratification promotions relating to the merchant location comprises at least one of: identifying, using a historical database, purchase locations from which consumer devices have previously purchased immediate gratification promotions redeemable at the merchant location, and defining the physical region around the merchant location as an area enclosing all of the identified purchase locations; defining the physical region around the merchant location based on physical regions established for similarly situated merchant locations; or receiving an indication of the physical region around the merchant location from a merchant device associated with the merchant location. In another such embodiment, selecting the consumer device from the subset of consumer devices that are located within the geo-fence includes extracting contextual data regarding the consumer device from the received contextual data; and determining, based on the contextual data regarding the consumer device, that the consumer would likely want a product or service offered by the merchant location.

In other such embodiments, the design circuitry is configured to identify the consumer device and the merchant location by determining a physical region associated which each particular consumer device of the set of consumer devices that indicates an area within which that particular consumer device is likely to redeem immediate gratification promotions, identifying a subset of merchant locations that are within the determined physical region associated with the consumer device, and selecting the merchant location from the subset of merchant locations based on the context contextual data regarding the consumer device and the resource management data regarding the subset of the identified merchant locations.

In some embodiments, the design circuitry is configured to generate the terms of the immediate gratification promotion based on the received contextual data and the received resource management data by extracting contextual data regarding the consumer device from the received contextual data, extracting resource management data regarding the merchant location from the received resource management data, determining, based on the context contextual data regarding the consumer device and the resource management data regarding the merchant location, a product or service to include in the immediate gratification promotion, retrieving a set of promotions offered by the merchant location, and selecting, based on the product or service to include in the immediate gratification promotion and the set of promotions offered by the merchant location, a cost to purchase the immediate gratification promotion, wherein the cost to purchase the immediate gratification promotion includes a value to be retained by a merchant associated with the merchant location and a value to be retained by a promotion and marketing service.

In some embodiments, the apparatus further includes processing circuitry configured to process payment for the immediate gratification promotion in response to receiving the message requesting purchase of the immediate gratification promotion. In one such embodiment, the processing circuitry is configured to process payment for the immediate gratification promotion by debiting an account associated with the consumer device, and causing the communications circuitry to transmit a message to the consumer device indicating that payment has been debited from an account associated with the consumer.

In some embodiments, the communications circuitry is further configured to receive a message indicating that a product or service identified in the immediate gratification promotion is ready for redemption, and transmit the message indicating that the product or service is ready for redemption to the consumer device.

In another example embodiment, a method is provided. The method includes receiving contextual data regarding a set of consumer devices, wherein the contextual data regarding the set of consumer devices at least identifies locations of each consumer device of the set of consumer devices, receiving resource management data regarding a set of merchant locations, transmitting, by communications circuitry and to a consumer device of the set of consumer devices, a message indicating terms of an immediate gratification promotion redeemable at a merchant location of the set of merchant locations, wherein the immediate gratification promotion comprises a promotion for which purchase automatically initiates redemption, receiving, from the consumer device, a message requesting purchase of the immediate gratification promotion, and generating, by design circuitry, the terms of the immediate gratification promotion based on the received contextual data and the received resource management data.

In some embodiments of the method, the contextual data regarding the set of consumer devices includes at least one of location, velocity, acceleration, angular velocity, direction-of-travel, mode of travel, temperature, humidity, brightness, gravity, orientation, proximity, recorded audio, time of day, day of the week, seasons, country identification, behavioral history, or one or more predefined consumer preferences.

In some embodiments of the method, the resource management data regarding the set of merchant locations includes at least one of: product inventory at the merchant location; identification or quantification of fixed, perishable resources at the merchant location; or one or more discount thresholds regarding one or more products or services offered for sale at the merchant location.

In some embodiments, the method further includes identifying the consumer device and the merchant location prior to generating the terms of the immediate gratification promotion.

In some such embodiments, identifying the consumer device and the merchant location includes determining a physical region associated with each particular merchant location of the set of merchant locations that indicates an area within which consumers are likely to purchase immediate gratification promotions redeemable at that particular merchant location, establishing a geo-fence associated with each merchant location of the set of merchant locations, wherein each geo-fence comprises a virtual perimeter enclosing the determined physical region associated with a corresponding merchant location, identifying, from the received contextual data, a subset of consumer devices that are located within the geo-fence associated with the merchant location, and selecting the consumer device from the subset of consumer devices that are located within the geo-fence. In one such embodiment, determining the physical region around the merchant location within which consumers are likely to purchase immediate gratification promotions relating to the merchant location comprises at least one of: identifying, using a historical database, purchase locations from which consumer devices have previously purchased immediate gratification promotions redeemable at the merchant location, and defining the physical region around the merchant location as an area enclosing all of the identified purchase locations; defining the physical region around the merchant location based on physical regions established for similarly situated merchant locations; or receiving an indication of the physical region around the merchant location from a merchant device associated with the merchant location. In another such embodiment, selecting the consumer device from the subset of consumer devices that are located within the geo-fence includes extracting contextual data regarding the consumer device from the received contextual data; and determining, based on the contextual data regarding the consumer device, that the consumer would likely want a product or service offered by the merchant location.

In other such embodiments, identifying the consumer device and the merchant location includes determining a physical region associated which each particular consumer device of the set of consumer devices that indicates an area within which that particular consumer device is likely to redeem immediate gratification promotions, identifying a subset of merchant locations that are within the determined physical region associated with the consumer device, and selecting the merchant location from the subset of merchant locations based on the context contextual data regarding the consumer device and the resource management data regarding the subset of the identified merchant locations.

In some embodiments, generating the terms of the immediate gratification promotion based on the received contextual data and the received resource management data includes extracting contextual data regarding the consumer device from the received contextual data, extracting resource management data regarding the merchant location from the received resource management data, determining, based on the context contextual data regarding the consumer device and the resource management data regarding the merchant location, a product or service to include in the immediate gratification promotion, retrieving a set of promotions offered by the merchant location, and selecting, based on the product or service to include in the immediate gratification promotion and the set of promotions offered by the merchant location, a cost to purchase the immediate gratification promotion, wherein the cost to purchase the immediate gratification promotion includes a value to be retained by a merchant associated with the merchant location and a value to be retained by a promotion and marketing service.

In some embodiments, the method includes processing payment for the immediate gratification promotion in response to receiving the message requesting purchase of the immediate gratification promotion. In one such embodiment, processing payment for the immediate gratification promotion includes debiting an account associated with the consumer device, and causing transmission of a message to the consumer device indicating that payment has been debited from an account associated with the consumer.

In some embodiments, the method further includes receiving a message indicating that a product or service identified in the immediate gratification promotion is ready for redemption, and transmit the message indicating that the product or service is ready for redemption to the consumer device.

In another example embodiment, an apparatus is provided. The apparatus includes means for receiving contextual data regarding a set of consumer devices, wherein the contextual data regarding the set of consumer devices at least identifies locations of each consumer device of the set of consumer devices, receiving resource management data regarding a set of merchant locations, means for transmitting, by communications circuitry and to a consumer device of the set of consumer devices, a message indicating terms of an immediate gratification promotion redeemable at a merchant location of the set of merchant locations, wherein the immediate gratification promotion comprises a promotion for which purchase automatically initiates redemption, means for receiving, from the consumer device, a message requesting purchase of the immediate gratification promotion, and means for generating, by design circuitry, the terms of the immediate gratification promotion based on the received contextual data and the received resource management data.

In some embodiments of the apparatus, the contextual data regarding the set of consumer devices includes at least one of location, velocity, acceleration, angular velocity, direction-of-travel, mode of travel, temperature, humidity, brightness, gravity, orientation, proximity, recorded audio, time of day, day of the week, seasons, country identification, behavioral history, or one or more predefined consumer preferences.

In some embodiments of the apparatus, the resource management data regarding the set of merchant locations includes at least one of: product inventory at the merchant location; identification or quantification of fixed, perishable resources at the merchant location; or one or more discount thresholds regarding one or more products or services offered for sale at the merchant location.

In some embodiments, the apparatus further includes means for identifying the consumer device and the merchant location prior to generating the terms of the immediate gratification promotion.

In some such embodiments, the means for identifying the consumer device and the merchant location includes means for determining a physical region associated with each particular merchant location of the set of merchant locations that indicates an area within which consumers are likely to purchase immediate gratification promotions redeemable at that particular merchant location, means for establishing a geo-fence associated with each merchant location of the set of merchant locations, wherein each geo-fence comprises a virtual perimeter enclosing the determined physical region associated with a corresponding merchant location, means for identifying, from the received contextual data, a subset of consumer devices that are located within the geo-fence associated with the merchant location, and means for selecting the consumer device from the subset of consumer devices that are located within the geo-fence. In one such embodiment, the means for determining the physical region around the merchant location within which consumers are likely to purchase immediate gratification promotions relating to the merchant location comprises at least one of: means for identifying, using a historical database, purchase locations from which consumer devices have previously purchased immediate gratification promotions redeemable at the merchant location, and means for defining the physical region around the merchant location as an area enclosing all of the identified purchase locations; means for defining the physical region around the merchant location based on physical regions established for similarly situated merchant locations; or means for receiving an indication of the physical region around the merchant location from a merchant device associated with the merchant location. In another such embodiment, the means for selecting the consumer device from the subset of consumer devices that are located within the geo-fence includes means for extracting contextual data regarding the consumer device from the received contextual data; and means for determining, based on the contextual data regarding the consumer device, that the consumer would likely want a product or service offered by the merchant location.

In other such embodiments, the means for identifying the consumer device and the merchant location includes means for determining a physical region associated which each particular consumer device of the set of consumer devices that indicates an area within which that particular consumer device is likely to redeem immediate gratification promotions, means for identifying a subset of merchant locations that are within the determined physical region associated with the consumer device, and means for selecting the merchant location from the subset of merchant locations based on the context contextual data regarding the consumer device and the resource management data regarding the subset of the identified merchant locations.

In some embodiments, the means for generating the terms of the immediate gratification promotion based on the received contextual data and the received resource management data includes means for extracting contextual data regarding the consumer device from the received contextual data, means for extracting resource management data regarding the merchant location from the received resource management data, means for determining, based on the context contextual data regarding the consumer device and the resource management data regarding the merchant location, a product or service to include in the immediate gratification promotion, means for retrieving a set of promotions offered by the merchant location, and means for selecting, based on the product or service to include in the immediate gratification promotion and the set of promotions offered by the merchant location, a cost to purchase the immediate gratification promotion, wherein the cost to purchase the immediate gratification promotion includes a value to be retained by a merchant associated with the merchant location and a value to be retained by a promotion and marketing service.

In some embodiments, the apparatus includes means for processing payment for the immediate gratification promotion in response to receiving the message requesting purchase of the immediate gratification promotion. In one such embodiment, the means for processing payment for the immediate gratification promotion includes means for debiting an account associated with the consumer device, and means for causing transmission of a message to the consumer device indicating that payment has been debited from an account associated with the consumer.

In some embodiments, the apparatus further includes means for receiving a message indicating that a product or service identified in the immediate gratification promotion is ready for redemption, and means for transmitting the message indicating that the product or service is ready for redemption to the consumer device.

In another example embodiment, an apparatus is provided. The apparatus includes context collection circuitry configured to collect contextual data regarding the consumer device, wherein the contextual data includes a location of the consumer device retrieved from location services circuitry included in the apparatus. The apparatus further includes communications circuitry configured to transmit the collected contextual data regarding the consumer device to a promotion and marketing service, in response to transmitting the collected contextual data regarding the consumer device to the promotion and marketing service, receive a message indicating terms of an immediate gratification promotion offered by a merchant, wherein the immediate gratification promotion comprises a promotion for which purchase automatically initiates redemption, and in response to receiving a request to purchase the immediate gratification promotion, transmit a message to the promotion and marketing service to purchase the immediate gratification promotion. The apparatus further includes input/output circuitry configured to output a message identifying the terms of the immediate gratification promotion.

In some embodiments, the context collection circuitry is configured to collect the contextual data regarding the consumer device by at least one of retrieving the contextual data regarding the consumer device from one or more sensors included in the apparatus, one or more databases included in the apparatus, via the communications circuitry, or via the input/output circuitry or deriving, using processing circuitry, the contextual data regarding the consumer device from other contextual data stored in one or more memory.

In some embodiments, the contextual data regarding the consumer device comprises at least one of location, velocity, acceleration, angular velocity, direction-of-travel, mode of travel, temperature, humidity, brightness, gravity, orientation, proximity, recorded audio, time of day, day of the week, seasons, country identification, behavioral history, or one or more predefined consumer preferences. In some embodiments, the input/output circuitry is further configured to receive a set of consumer privacy restrictions, and the context collection circuitry is configured to collect contextual data in accordance with the received consumer privacy restrictions.

In some embodiments, immediate gratification promotion is generated based on the collected contextual data regarding the consumer device and resource management data regarding the merchant.

In some embodiments, the input/output circuitry is configured to output the message identifying the terms of the immediate gratification promotion via a notification tray alert, a notification center message, an in-app message, a multimedia messaging service (MMS) text message, a non-MMS text message, or an email.

In some embodiments, the input/output circuitry is further configured to receive the request to purchase the immediate gratification promotion from a consumer in response to outputting the message identifying the terms of the immediate gratification promotion.

In some embodiments, the apparatus further includes negotiation circuitry configured to, in an instance in which the contextual data includes a predefined consumer preference instructing the apparatus to automatically purchase relevant promotions: generate the request to purchase the immediate gratification promotion, and transmit the request to purchase the immediate gratification promotion to the communications circuitry. In some such embodiments, 28, the negotiation circuitry is further configured to determine that the terms of the immediate gratification promotion satisfy triggering criteria included in the predefined consumer preferences, and generate the indication to purchase the immediate gratification promotion in response to determining that the terms of the immediate gratification promotion satisfy the triggering criteria.

In some embodiments, the communications circuitry is further configured to receive an indication that a product or service identified in the immediate gratification promotion is ready for redemption, and the input/output circuitry is configured to output a message indicating that the product or service is ready for redemption via a notification tray alert, a notification center message, an in-app message, a multimedia messaging service (MMS) text message, a non-MMS text message, or an email.

In another example embodiment, a method is provided. The method includes collecting contextual data regarding the consumer device, wherein the collected contextual data includes a location of the consumer device retrieved from location services circuitry included in the consumer device, and transmitting, by communications circuitry, the collected contextual data regarding the consumer device to a promotion and marketing service. The method further includes, in response to transmitting the collected contextual data regarding the consumer device to the promotion and marketing service, receiving a message indicating terms of an immediate gratification promotion offered by a merchant, wherein the immediate gratification promotion comprises a promotion for which purchase automatically initiates redemption, outputting, by input/output circuitry, a message identifying the terms of the immediate gratification promotion, and in response to receiving a request to purchase the immediate gratification promotion, transmit a message to the promotion and marketing service to purchase the immediate gratification promotion.

In some embodiments, collecting the contextual data regarding the consumer device includes at least one of retrieving the contextual data regarding the consumer device from one or more sensors included in the apparatus, one or more databases included in the apparatus, via the communications circuitry, or via the input/output circuitry, or deriving, using processing circuitry, the contextual data regarding the consumer device from other contextual data stored in one or more memory.

In some embodiments, the contextual data regarding the consumer device includes at least one of location, velocity, acceleration, angular velocity, direction-of-travel, mode of travel, temperature, humidity, brightness, gravity, orientation, proximity, recorded audio, time of day, day of the week, seasons, country identification, behavioral history, or one or more predefined consumer preferences.

In some embodiments, the method further includes receiving a set of consumer privacy restrictions, wherein collecting the contextual data comprises collecting the contextual data in accordance with the received consumer privacy restrictions.

In some embodiments, the immediate gratification promotion is generated based on the collected contextual data regarding the consumer device and resource management data regarding the merchant.

In some embodiments, the method further includes outputting the message identifying the terms of the immediate gratification promotion comprises outputting the message identifying the terms of the immediate gratification promotion via a notification tray alert, a notification center message, an in-app message, a multimedia messaging service (MMS) text message, a non-MMS text message, or an email.

In some embodiments, the method further includes receiving the request to purchase the immediate gratification promotion from a consumer in response to outputting the message identifying the terms of the immediate gratification promotion.

In some embodiments, the method further includes, in an instance in which the contextual data includes a predefined consumer preference instructing the apparatus to automatically purchase relevant promotions generating, by negotiation circuitry, the request to purchase the immediate gratification promotion, and transmitting the request to purchase the immediate gratification promotion to the communications circuitry. In some such embodiments, the method further includes determining, by the negotiation circuitry, that the terms of the immediate gratification promotion satisfy triggering criteria included in the predefined consumer preferences, wherein generating the indication to purchase the immediate gratification promotion occurs in response to determining that the terms of the immediate gratification promotion satisfy the triggering criteria.

In some embodiments, the method further includes receiving an indication that a product or service identified in the immediate gratification promotion is ready for redemption, and outputting, by the input/output circuitry, a message indicating that the product or service is ready for redemption via a notification tray alert, a notification center message, an in-app message, a multimedia messaging service (MMS) text message, a non-MMS text message, or an email.

In another example embodiment, an apparatus is provided. The apparatus includes means for collecting contextual data regarding the consumer device, wherein the collected contextual data includes a location of the consumer device retrieved from location services circuitry included in the consumer device, and means for transmitting, by communications circuitry, the collected contextual data regarding the consumer device to a promotion and marketing service. The apparatus further includes, means for, in response to transmitting the collected contextual data regarding the consumer device to the promotion and marketing service, receiving a message indicating terms of an immediate gratification promotion offered by a merchant, wherein the immediate gratification promotion comprises a promotion for which purchase automatically initiates redemption, means for outputting a message identifying the terms of the immediate gratification promotion, and means for, in response to receiving a request to purchase the immediate gratification promotion, transmitting a message to the promotion and marketing service to purchase the immediate gratification promotion.

In some embodiments, the means for collecting the contextual data regarding the consumer device includes at least one of means for retrieving the contextual data regarding the consumer device from one or more sensors included in the apparatus, one or more databases included in the apparatus, from a separate device or from a user, or means for deriving the contextual data regarding the consumer device from other contextual data stored in one or more memory.

In some embodiments, the contextual data regarding the consumer device includes at least one of location, velocity, acceleration, angular velocity, direction-of-travel, mode of travel, temperature, humidity, brightness, gravity, orientation, proximity, recorded audio, time of day, day of the week, seasons, country identification, behavioral history, or one or more predefined consumer preferences.

In some embodiments, the apparatus further includes means for receiving a set of consumer privacy restrictions, wherein collecting the contextual data comprises collecting the contextual data in accordance with the received consumer privacy restrictions.

In some embodiments, the immediate gratification promotion is generated based on the collected contextual data regarding the consumer device and resource management data regarding the merchant.

In some embodiments, the apparatus further includes means for outputting the message identifying the terms of the immediate gratification promotion comprises means for outputting the message via a notification tray alert, a notification center message, an in-app message, a multimedia messaging service (MMS) text message, a non-MMS text message, or an email.

In some embodiments, the apparatus further includes means for receiving the request to purchase the immediate gratification promotion from a consumer in response to outputting the message identifying the terms of the immediate gratification promotion.

In some embodiments, the apparatus further includes means for, in an instance in which the contextual data includes a predefined consumer preference instructing the apparatus to automatically purchase relevant promotions, generating the request to purchase the immediate gratification promotion, and means for transmitting the request to purchase the immediate gratification promotion. In some such embodiments, the apparatus further includes means for determining that the terms of the immediate gratification promotion satisfy triggering criteria included in the predefined consumer preferences, wherein the means for generating the indication to purchase the immediate gratification promotion is further configured to generate the indication in response to determining that the terms of the immediate gratification promotion satisfy the triggering criteria.

In some embodiments, the apparatus further includes means for receiving an indication that a product or service identified in the immediate gratification promotion is ready for redemption, and means for outputting a message indicating that the product or service is ready for redemption via a notification tray alert, a notification center message, an in-app message, a multimedia messaging service (MMS) text message, a non-MMS text message, or an email.

In yet another example embodiment, an apparatus is provided. The apparatus includes resource management circuitry configured to collect resource management data regarding a merchant location associated with the merchant device. The apparatus further includes communications circuitry configured to transmit the collected resource management data regarding the merchant location to a promotion and marketing service, and receive a message from the promotion and marketing service indicating terms of an immediate gratification promotion purchased by a consumer for redemption at the merchant location, wherein the immediate gratification promotion comprises a promotion for which purchase automatically initiates redemption. The apparatus further includes input/output circuitry configured to output a message identifying the terms of the immediate gratification promotion.

In some embodiments, the resource management circuitry is configured to collect the resource management data regarding the consumer device by at least one of: retrieving the resource management data regarding the merchant location from one or more memories included in the apparatus or located externally to the apparatus; or receiving the resource management data via the input/output circuitry.

In some embodiments, the resource management data regarding the merchant location includes at least one of: product inventory at the merchant location; identification or quantification of fixed, perishable resources at the merchant location; or one or more discount thresholds regarding one or more products or services offered for sale at the merchant location. In some such embodiments, the apparatus is further configured to receive the one or more discount thresholds from a merchant representative via the input/output circuitry or from another device via the communications circuitry.

In some embodiments, the immediate gratification promotion is generated based on collected contextual data regarding the consumer device and the collected resource management data regarding the merchant location.

In some embodiments, the input/output circuitry is configured to output the message identifying the terms of the immediate gratification promotion via a notification tray alert, a notification center message, an in-app message, a multimedia messaging service (MMS) text message, a non-MMS text message, or an email.

In some embodiments, the input/output circuitry is configured to receive an indication that a product or service purchased via the immediate gratification promotion is ready for redemption. In some such embodiments, the communications circuitry is further configured to, in response to receiving the indication that the product or service purchased via the immediate gratification promotion is ready for redemption, transmit a message indicating that the purchased product or service is ready for redemption.

In some embodiments, the apparatus further includes processing circuitry configured to process payment for the promotion in response to receiving the message requesting purchase of the promotion. In some such embodiments, the processing circuitry is configured to process payment for the promotion by debiting an account associated with the consumer device and causing the communications circuitry to transmit a message to the consumer device indicating that payment has been debited from an account associated with the consumer.

In another example embodiment, a method is provided. The method includes collecting resource management data regarding a merchant location associated with the merchant device, transmitting, by communications circuitry, the collected resource management data regarding the merchant location to a promotion and marketing service, receiving a message from the promotion and marketing service indicating terms of an immediate gratification promotion purchased by a consumer for redemption at the merchant location, wherein the immediate gratification promotion comprises a promotion for which purchase automatically initiates redemption, and outputting, by input/output circuitry, a message identifying the terms of the immediate gratification promotion.

In some embodiments, collecting the resource management data regarding the consumer device includes at least one of: retrieving the resource management data regarding the merchant location from one or more memories included in the apparatus or located externally to the apparatus; or receiving the resource management data via the input/output circuitry.

In some embodiments, the resource management data regarding the merchant location includes at least one of: product inventory at the merchant location; identification or quantification of fixed, perishable resources at the merchant location; or one or more discount thresholds regarding one or more products or services offered for sale at the merchant location. In some such embodiments, the method includes receiving the one or more discount thresholds from a merchant representative via the input/output circuitry or from another device via the communications circuitry.

In some embodiments, the immediate gratification promotion is generated based on collected contextual data regarding the consumer device and the collected resource management data regarding the merchant location.

In some embodiments, the method includes outputting, by the input/output circuitry, the message identifying the terms of the immediate gratification promotion via a notification tray alert, a notification center message, an in-app message, a multimedia messaging service (MMS) text message, a non-MMS text message, or an email.

In some embodiments, the method includes receiving, by the input/output circuitry, an indication that a product or service purchased via the immediate gratification promotion is ready for redemption. In some such embodiments, the method includes, in response to receiving the indication that the product or service purchased via the immediate gratification promotion is ready for redemption, transmitting a message indicating that the purchased product or service is ready for redemption.

In some embodiments, the method further includes processing payment for the promotion in response to receiving the message requesting purchase of the promotion. In some such embodiments, the method includes processing the payment by debiting an account associated with the consumer device and causing transmission of a message to the consumer device indicating that payment has been debited from an account associated with the consumer.

In another example embodiment, an apparatus is provided. The apparatus includes means for collecting resource management data regarding a merchant location associated with the merchant device, means for transmitting the collected resource management data regarding the merchant location to a promotion and marketing service, means for receiving a message from the promotion and marketing service indicating terms of an immediate gratification promotion purchased by a consumer for redemption at the merchant location, wherein the immediate gratification promotion comprises a promotion for which purchase automatically initiates redemption, and means for outputting a message identifying the terms of the immediate gratification promotion.

In some embodiments, the means for collecting the resource management data regarding the consumer device includes at least one of: means for retrieving the resource management data regarding the merchant location from one or more memories included in the apparatus or located externally to the apparatus; or means for receiving the resource management data via the input/output circuitry.

In some embodiments, the resource management data regarding the merchant location includes at least one of: product inventory at the merchant location; identification or quantification of fixed, perishable resources at the merchant location; or one or more discount thresholds regarding one or more products or services offered for sale at the merchant location. In some such embodiments, the apparatus includes means for receiving the one or more discount thresholds from a merchant representative.

In some embodiments, the immediate gratification promotion is generated based on collected contextual data regarding the consumer device and the collected resource management data regarding the merchant location.

In some embodiments, the apparatus includes means for outputting the message identifying the terms of the immediate gratification promotion via a notification tray alert, a notification center message, an in-app message, a multimedia messaging service (MMS) text message, a non-MMS text message, or an email.

In some embodiments, the apparatus includes means for receiving an indication that a product or service purchased via the immediate gratification promotion is ready for redemption. In some such embodiments, the apparatus includes, means for, in response to receiving the indication that the product or service purchased via the immediate gratification promotion is ready for redemption, transmitting a message indicating that the purchased product or service is ready for redemption.

In some embodiments, the apparatus further includes means for processing payment for the promotion in response to receiving the message requesting purchase of the promotion. In some such embodiments, the means for processing the payment includes means for debiting an account associated with the consumer device and means for causing transmission of a message to the consumer device indicating that payment has been debited from an account associated with the consumer.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
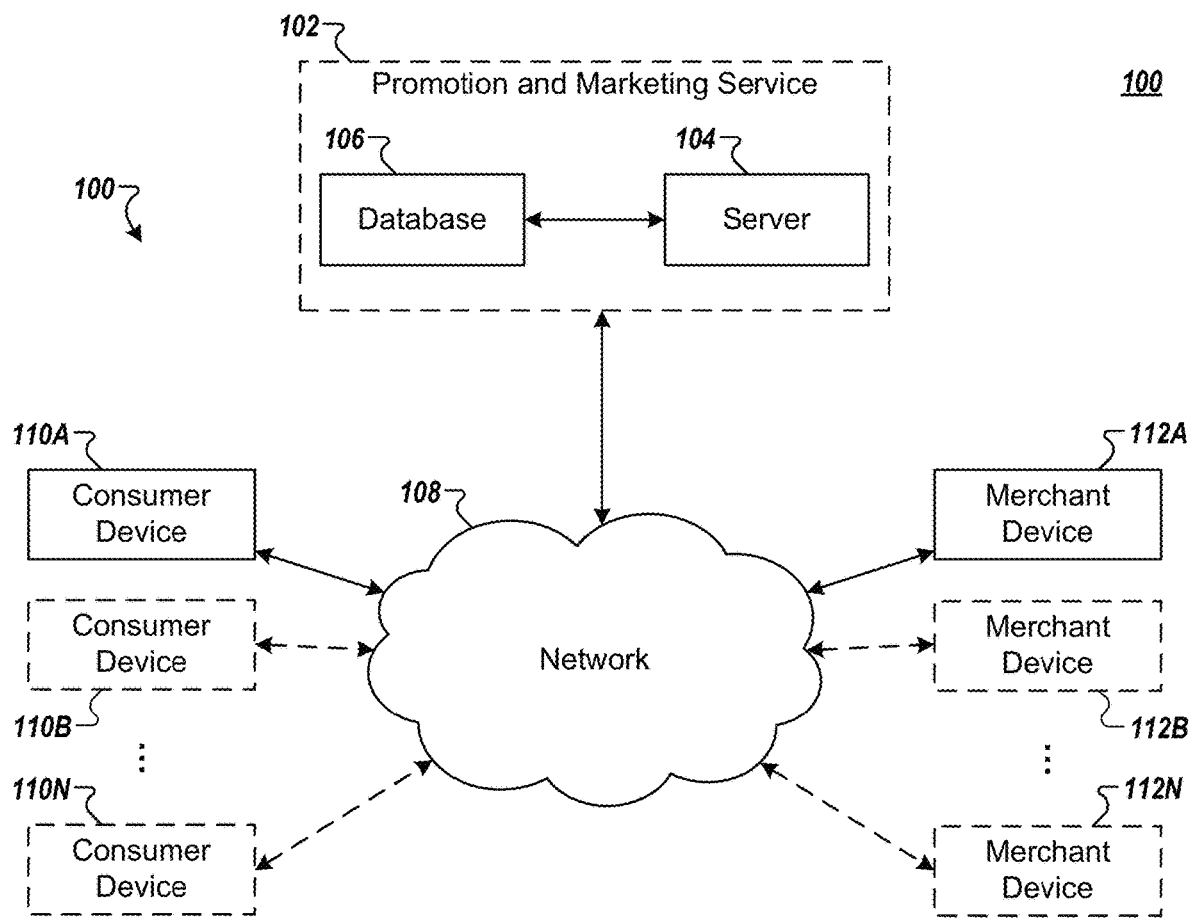
Figure 3:
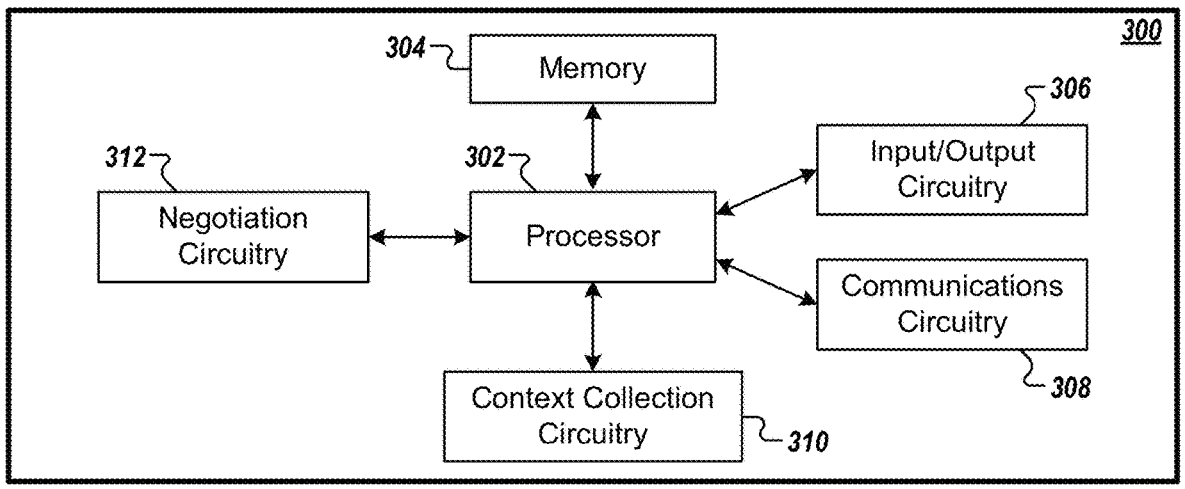
Figure 4:
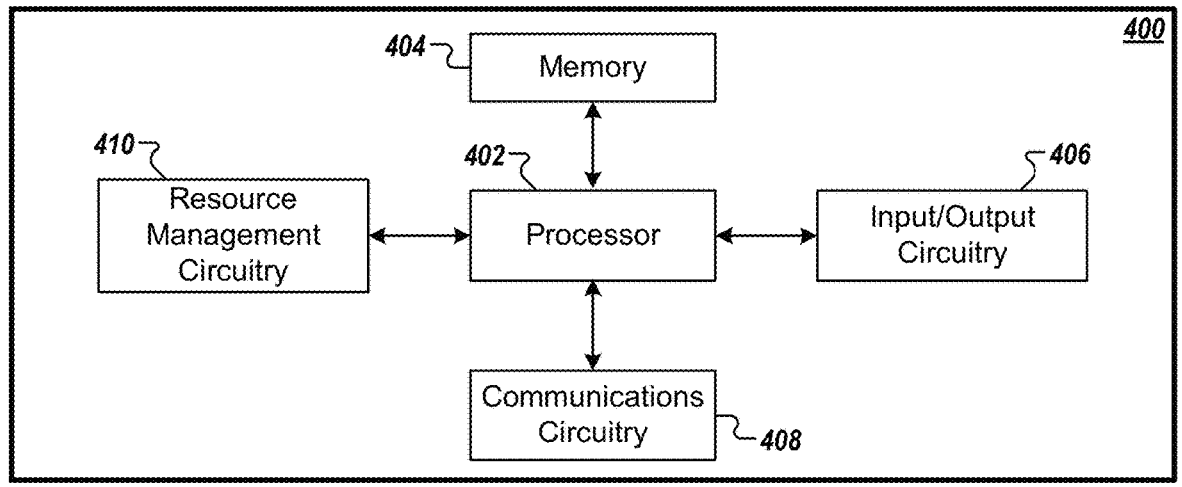
Figure 5:
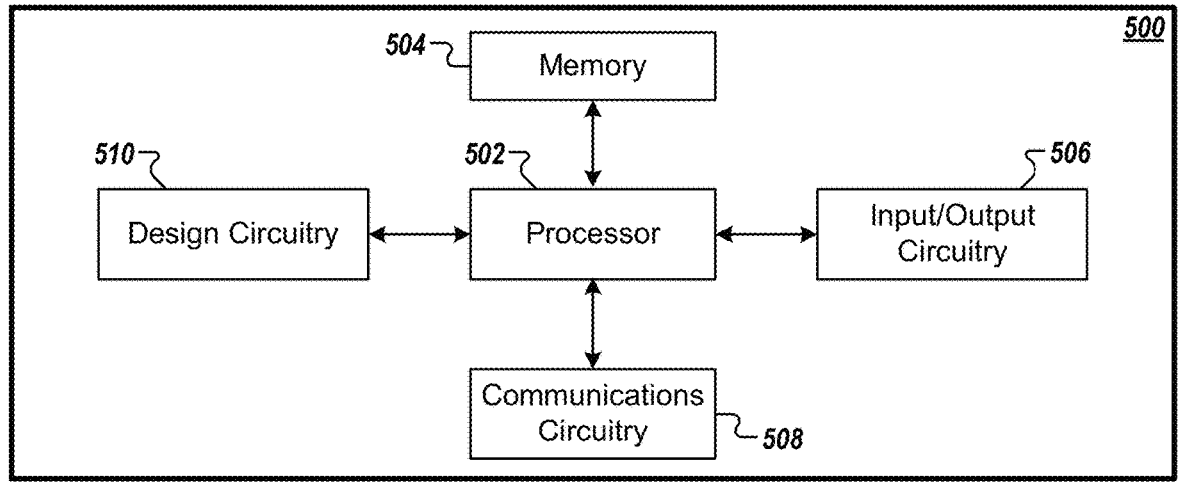
Figure 6:
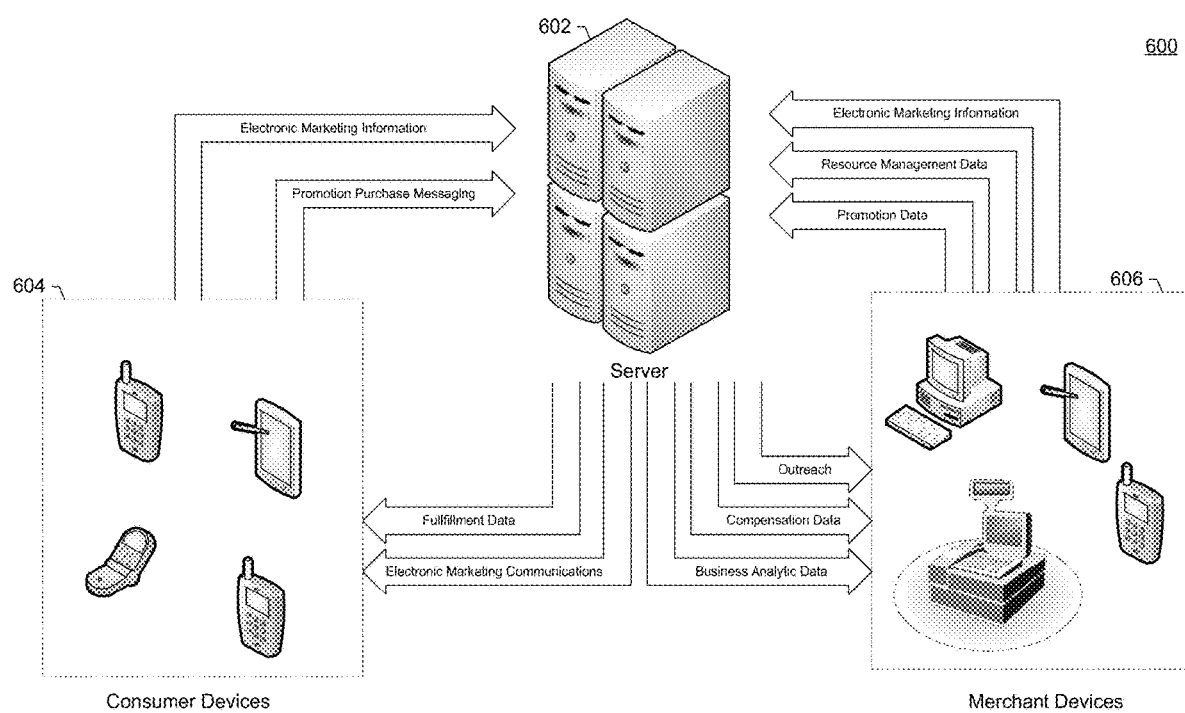
Figure 7:
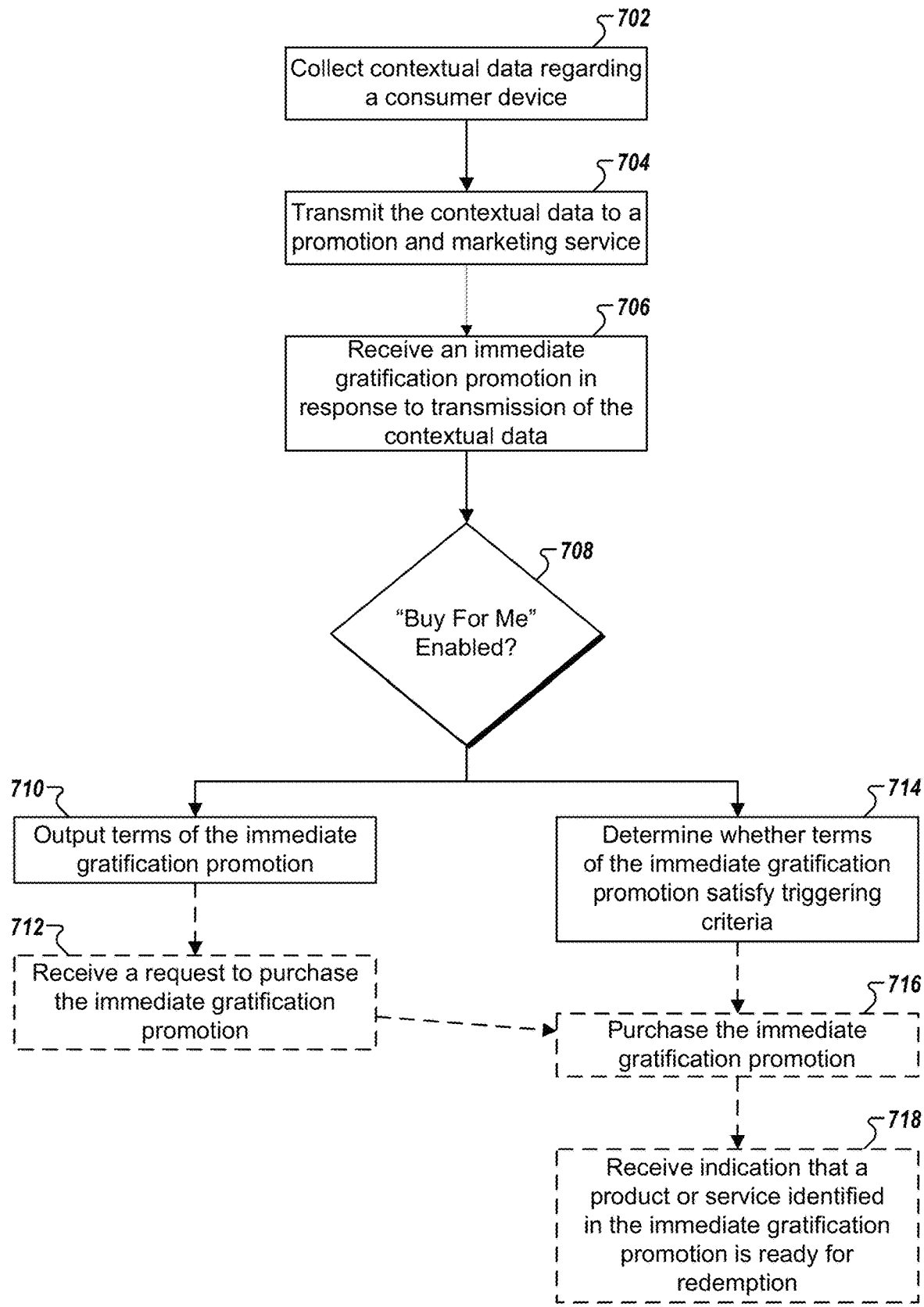
Figure 8:
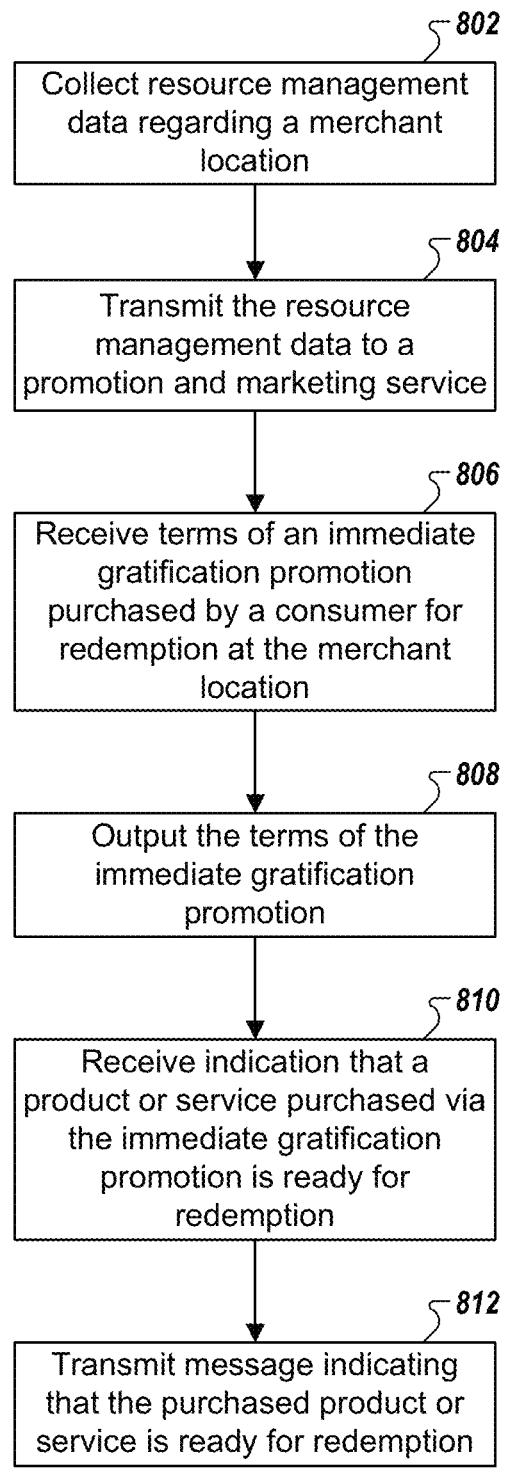
Figure 9:
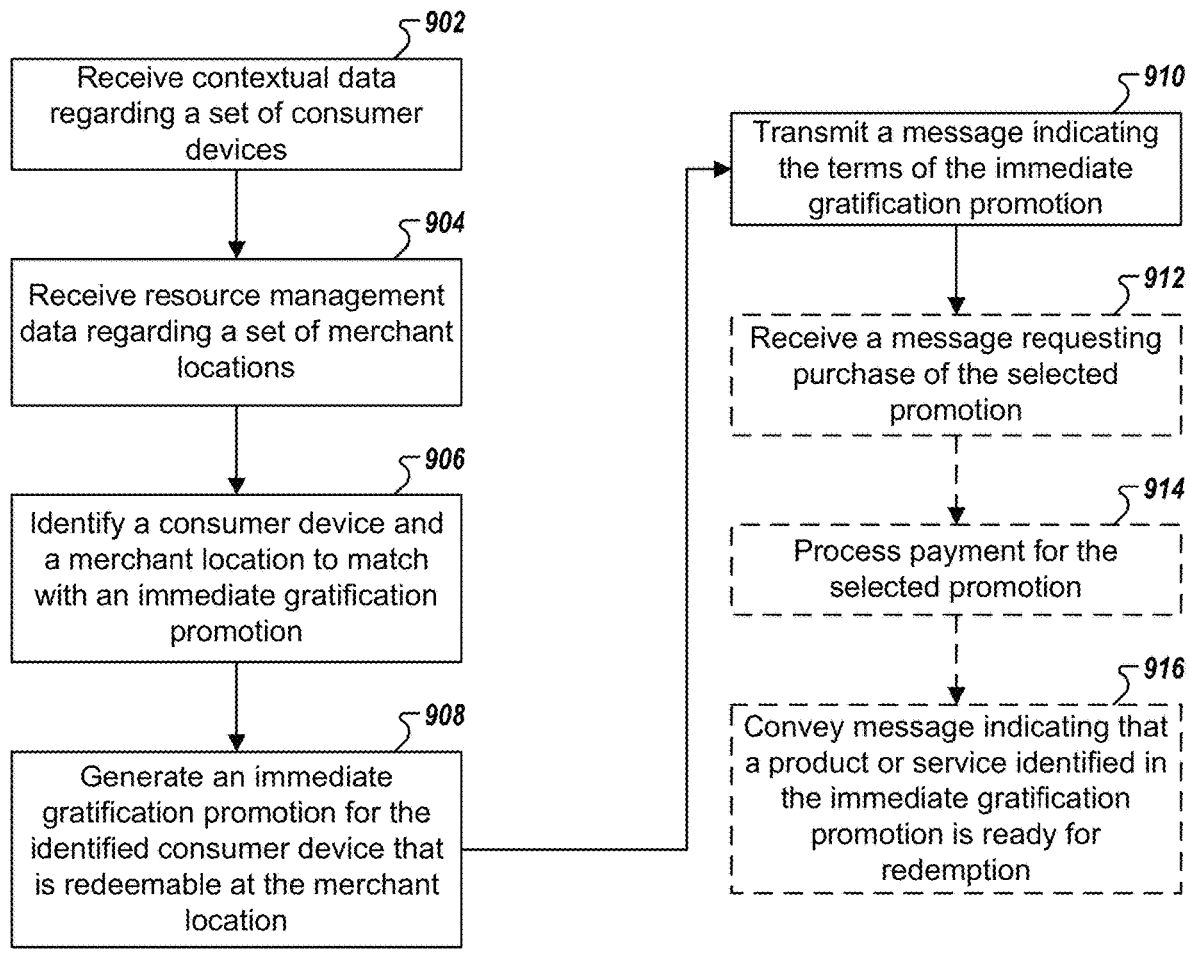
Figure 12A:
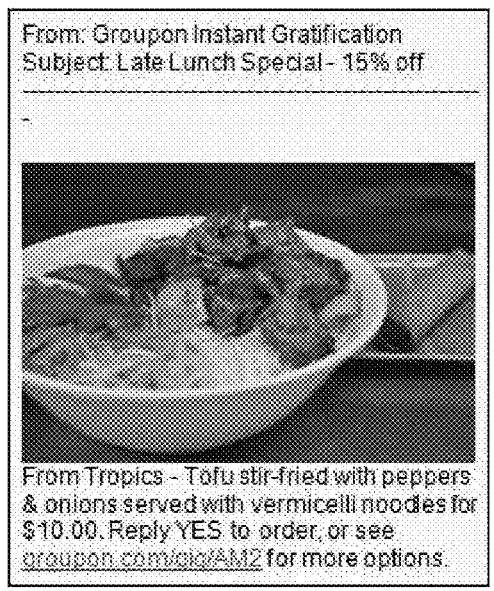
Figure 12B:
Figure 12C:
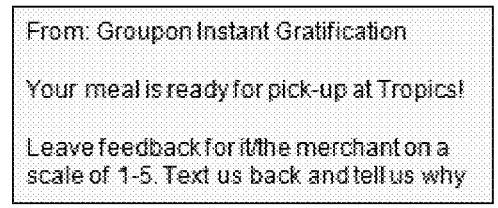

Having thus described certain example embodiments of the present disclosure in general terms, reference will now be made to the accompanying drawings, which are not necessarily drawn to scale, and wherein:

FIG. 1 shows an example system diagram, in accordance with an example embodiment of the present invention;

FIG. 2A illustrates a user interface for configuring privacy settings associated with a consumer device, in accordance with some example embodiments;

FIG. 2B illustrates a user interface for configuring promotion thresholds associated with a merchant location, in accordance with some example embodiments;

FIG. 3 illustrates a schematic block diagram of circuitry embodying a consumer device, in accordance with some example embodiments;

FIG. 4 illustrates a schematic block diagram of circuitry embodying a merchant device, in accordance with some example embodiments;

FIG. 5 illustrates a schematic block diagram of circuitry embodying a server device, in accordance with some example embodiments;

FIG. 6 illustrates an example data flow diagram illustrating interactions between a central server, one or more consumer devices, and one or more merchant devices, in accordance with some example embodiments;

FIG. 7 illustrates a flowchart describing example operations performed by a consumer device, in accordance with some example embodiments;

FIG. 8 illustrates a flowchart describing example operations performed by a merchant device, in accordance with some example embodiments;

FIGS. 9, 10, and 11 illustrate flowcharts describing example operations performed by a promotion and marketing service, in accordance with some example embodiments; and FIGS. 12A, 12B, and 12C illustrate screen captures of a scenario implementing an example embodiment.

DETAILED DESCRIPTION

Overview

Businesses of all types continue to search for ways to increase revenue and profit. For promotion and marketing services, the goal is to identify new ways to market products and services to consumers while still adding value for merchants. Utilizing mobile network connectivity, the inventors have developed example systems that provide relevant product offerings that were impossible to implement before the emergent ubiquity of mobile devices.

To this end, one goal of a promotion and marketing service is to develop promotions that are more effective for merchants by increasing success rate, overspend, and/or up-sell potential. In this regard, analyzing and capturing relevant contextual data from consumers provides the foundational data necessary to achieve this goal. Collection of contextual data also provides new levels of fulfillment for yield-management tools (e.g., it is possible to fill an empty table in a restaurant during lunch time with an immediate gratification promotion, while a traditional promotion may not attract a customer on short notice.

Example systems described below in greater detail enable the generation and use of promotions that are highly relevant to consumers, address needs identified by merchants, and are profitable to a promotion and marketing service. By gathering contextual data regarding consumer devices and resource management data regarding merchant locations, a promotion and marketing service can passively and automatically identify situations in which promotions may be effectively deployed (i.e., situations in which a promotion is both relevant to a consumer and address a merchant need). In this regard, proximity density mapping provides a new metric for identifying relevant promotions. Moreover, using knowledge regarding both consumers and merchants, the promotion and marketing service is uniquely situated to develop and deploy immediate gratification promotions, which provide easy and highly relevant choices to consumers. Because generation, deployment, purchase, and redemption of immediate gratification promotions can occur automatically and with minimal active input from consumers and merchants, it is far more likely that consumers and merchants will utilize and benefit from immediate gratification promotions than from other promotional materials.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "vendor," "provider," and "merchant" may be used interchangeably and may include, but are not limited to, a business owner, consigner, shopkeeper, tradesperson, operator, entrepreneur, agent, dealer, organization or the like that is in the business of a providing a good, service or experience to a consumer, facilitating the provision of a good, service or experience to a consumer and/or otherwise operating in the stream of commerce. The "vendor," "provider," or "merchant" need not actually market a product or service via the promotion and marketing service, and may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "immediate gratification promotion" describes a customized promotion that can be both purchased and redeemed by a consumer with a single message. For example, a promotion may comprise an offer for 15% off lunch at a particular restaurant; an immediate gratification promotion may comprise a customized offer for delivery to a particular consumer to purchase a specific meal off the restaurant menu. Acceptance of the immediate gratification promotion via the consumer's device causes the promotion and marketing service to charge a payment account associated with the consumer and also begins the redemption process (e.g., causes the merchant to prepare the meal). In some embodiments, the immediate gratification promotion may be generated using contextual data regarding a set of consumer devices (defined below) and resource management data regarding a set of merchant locations. In many embodiments, the immediate gratification promotion is generated by a promotion and marketing service, which can receive the contextual data from one or more consumer devices and can receive the resource management data from one or more merchant devices. In this regard, because immediate gratification promotions include a great degree of particularity, immediate gratification promotions can have short durations of validity (e.g., measured in minutes or hours rather than in days).

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to the subset of types of electronic data and signals that may be interpreted by a promotion and marketing service to provide improved electronic marketing communications. Electronic marketing information may include, without limitation, clickstream data (defined below), transaction data (defined below), location data (defined below), contextual data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer device. In some embodiments, location data provided by a merchant may indicate the location of consumer devices within their retail location. In some embodiments, location data may be provided by merchants to indicate the current location of the merchant (e.g., a food truck or delivery service). It should be appreciated that location data may be provided by various systems capable of determining location information, including, but not limited to, global positioning service (GPS) receivers, indoor navigation systems, cellular tower triangulation techniques, video surveillance systems, or radio frequency identification (RFID) location systems.

As used herein, the term "contextual data" refers to electronic information providing information regarding the context of a particular device or individual. For instance, contextual data may be associated with a consumer account and may be collected from a consumer device, a merchant device, or any other entity capable of interaction with the promotion and marketing service. Contextual data may include preference settings input by the consumer or on behalf of the consumer. In addition, in some embodiments, contextual data includes location data provided by a location services module of a particular device. In addition to location data, however, contextual data may include velocity or acceleration data, gyroscopic data, data regarding a direction-of-travel, calculated data regarding the mode of travel (e.g., walking, jogging, biking, vehicular movement, or the like) of the particular device. Contextual data may also comprise sensor readings regarding ambient environmental conditions of the particular device (e.g., temperature, humidity, brightness, gravity, orientation, proximity, or the like) and may further comprise interpretations of audio data captured by a microphone. Moreover, contextual data may include environmental indicators, such as the time of the day, day of the week, seasons, country identification, or the like. Contextual data may also include historical information stored by the device or retrieved from another device (or from a promotion and marketing service). Accordingly, contextual information may form the basis of a consumer relevance determination. It should be appreciated that contextual data may be provided by various systems and sensors provided by a particular device or by devices under control of that particular device, contextual data may be received from other devices, or contextual data may be received from local or external databases or from a user via a user interface. Contextual information may further include results generated as a result of analyzing other contextual data.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service or a merchant and to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "merchant-specific correspondence" refers to any electronically generated information content provided by the promotion and marketing service to a merchant for the purpose of merchant acquisition. Merchant-specific correspondence may include any email, short message service (SMS) message, web page, application interface, or the like electronically generated for the purpose of attempting to develop a business relationship with the merchant.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

It should be appreciated that the term "resource management" is intended to refer to a marketing strategy designed to manage and maximize a merchant's revenue stream. In this regard, resource management comprises the analysis of underlying resource management data (e.g., product inventory and any other fixed, perishable resources at a merchant location). In some embodiments, resource management data may include preconfigured acceptable discount thresholds selected by a merchant (e.g., if customer traffic is below a particular rate, a 10% discount is acceptable, although if traffic is below a second, lower, rate, then a 20% discount is acceptable). For example, a restaurant may monitor its resource management data to determine table utilization, bar capacity, or the like, and, if utilization is low, may authorize a range of acceptable thresholds designed to reward new customers to the restaurant based on these preconfigured promotion thresholds. As another example, a retail location that has received minimal foot traffic in a particular timeframe may authorize steeper discounts on its products with the hope of spurring customer interest. As yet another example, a merchant that has excess supply of a particular item may indicate acceptability of a larger discount for that item.

As used herein, a "triggering criteria" refers to predefined set of circumstances that automatically prompt a consumer device to purchase a promotion. Satisfaction of triggering criteria may be identified from analysis of the contextual data regarding a particular consumer device. For example, if a consumer predefines consumer preferences to establish particular triggering criteria to use to automatically purchase a promotion, the consumer device may identify a triggering event prompted by satisfaction of the particular triggering criteria. It should be understood that triggering criteria may be time-wise in nature (e.g., occurrence of a particular time of day, a weekend, a holiday, or a seasonal change), or may occur based on the occurrence of an external event (e.g., listing or conclusion of a promotion on a competing promotion and marketing service, identification of increased merchant need based on resource management data received regarding the merchant location, or the like). Triggering criteria may be identified based on combinations of the above events. For instance, triggering criteria may not all be satisfied simply based on a time of day, but may require occurrence of additional criteria as well, such as if a consumer location indicates travel and the time of day suggests a typical meal-time (e.g., lunch) is approaching.

Technical Underpinnings and

Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different ways, such as traditional advertising, promotional offerings, market research, and various other marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient manner. For instance, electronic marketing services are hindered by technological obstacles unique to the electronic nature of the services provided, such as constraints on the speed and accuracy of human-machine communication. In the face of increasing reliance on human-machine interaction as a central element of many consumer activities, the clumsiness of interaction between users and machinery remains a bottleneck for consumers and merchants alike. Accordingly, there remain significant problems associated with providing relevant, high quality electronic marketing communications to consumers and merchants in a manner that is user friendly and avoids frustration.

In order to address these concerns, embodiments of the present invention remove many layers of human-machine interaction and thereby improve the speed and accuracy of promotion marketing operations, to the benefit of both consumers and merchants. Accordingly, embodiments of the present invention therefore provide improvements that address problems arising out of the electronic nature of existing services.

Moreover, embodiments of the present invention unlock promotional possibilities that previously were not possible, given the speed of interaction between consumer and merchant devices. In this regard, passive and automated monitoring and analysis of data received by consumer devices enables the generation of highly relevant and easy to purchase immediate gratification promotions having narrow durations of availability (e.g., promotions that are available for a matter of minutes or hours) that fill unplanned immediate needs, where prior mechanisms for developing promotions could not address these goals. Moreover, because of the standardization of sensor technology on mobile devices, in conjunction with improvements in personal area network (PAN) technology, passive interaction between devices is increasingly practical for every-day use.

Accordingly, various embodiments of the present invention provide systems that passively and automatically collect contextual data regarding consumer devices (e.g., information regarding locations of consumer devices, future travel predictions, time of day, or the like) and resource management data regarding merchant locations, and utilize this near real-time data to identify highly relevant promotions (e.g., based on location and, in some embodiments, proximity density mapping analysis) and/or immediate gratification promotions that streamline the promotion purchasing and redemption experience. Such embodiments thus avoid hurdles imposed by traditional mechanisms of generating promotions, such as the annoyance of irrelevant marketing materials and the requirement for significant human-machine interaction that historically has dissuaded many consumers and merchants from utilizing a promotion and marketing service. Moreover, because location-centric relevance was not possible prior to ubiquity of global positioning services, the ability to provide promotions with such relevance emerges from the advancement of device technology itself. Accordingly, various embodiments of the present invention provide a new avenue for near real-time generation and purchasing of promotions that has not historically been possible.

System Architecture and Example Apparatuses

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more consumer or merchant devices. Example embodiments include any of a variety of mobile terminals, such as a portable digital assistant (PDA), mobile telephone, smartphone, laptop computer, tablet computer, or any combination of the aforementioned devices.

In this regard, FIG. 1 discloses an example computing system 100 within which embodiments of the present invention may operate. As illustrated, a promotion and marketing service 102 may be connected to a network 108 (e.g., the Internet, or the like), using which the promotion and marketing service 102 may communicate with a series of consumer devices 110A through 110N. Similarly, merchants may interact with the promotion and marketing service 102 via the network 108 using a series of merchant devices 112A through 112N. The promotion and marketing service 102 may comprise a server 104 in communication with a database 106.

The server 104 may be embodied as a computer or computers as known in the art. The server 104 may provide for receiving of electronic marketing information from various sources, including but not necessarily limited to the consumer devices 110A-110N and the merchant devices 112A-112N. For example, the server 104 may be operable to receive and process clickstream data or contextual data provided by the consumer devices 114 and/or the merchant devices 112. The server 104 may also facilitate e-commerce transactions based on transaction information provided by the consumer devices 114 and/or the merchant devices 112. The server 104 may facilitate the generation and provision of various electronic communications and marketing materials based on the received electronic marketing information.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include user account credentials for merchants, and consumers, data indicating the products and promotions offered by the promotion and marketing service, electronic marketing information (e.g., clickstream data, transaction data, location data, communication channel data, or discretionary data), analytic results, reports, financial data, and/or the like.

The consumer devices 110A-110N may be embodied by any computing devices known in the art. Electronic marketing information received by the server 104 from the consumer devices 110A-110N may be provided in various forms and via various methods. For example, the consumer devices 110A-110N may include laptop computers, smartphones, netbooks, tablet computers, wearable devices, or the like. The information may be provided through various sources on these consumer devices.

In some embodiments, the mobile device may execute an "app" to interact with the promotion and marketing service 102 and/or merchant devices 112A-112N. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

In the case of a consumer device 110, the promotion and marketing service 102 may leverage the application framework offered by the mobile operating system to allow consumers to designate which information is harvested by the app and which may then be provided to the promotion and marketing service 102. In some embodiments, consumers may "opt in" to provide particular different types of contextual data in exchange for a benefit, such as improved relevance of marketing communications offered to the user. As shown in FIG. 2A, during installation or use of the app, the consumer may be provided with options for configuring privacy settings and with terms and conditions governing use of the electronic marketing information harvested by the consumer device 110 and provided to the promotion and marketing service 102. Once the consumer provides access to a particular feature of the consumer device 110, information derived from that feature may in some embodiments be provided to the promotion and marketing service 102 to improve the quality of the consumer's interactions with the promotion and marketing service and/or with merchants.

For example, a consumer may indicate a desire to provide location information to the app from location services circuitry included in the consumer's mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that while the app may enable configuration of privacy settings, the various mobile device operating systems may also provide the ability to regulate the types of information provided to the app associated with the promotion and marketing service 102. For example, the consumer may decide to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes any social networking capabilities, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 110 may interact with the promotion and marketing service 102 or merchant device 112 via a web browser. As yet another example, the consumer device 110 may include various hardware or firmware designed to interface with the promotion and marketing service 102 or merchant device 112 (e.g., where the consumer device 110 is a purpose-built device offered for the primary purpose of communicating with the promotion and marketing service 102).

The merchant devices 112A-112N may be any computing devices known in the art and operated by a merchant. For example, the merchant devices 112A-112N may include a merchant point-of-sale device, a merchant e-commerce server, a merchant inventory system, a computing device accessing a web site designed to provide merchant access (e.g., a smartphone, PDA, or desktop computer configured to access a web page via a browser using a set of merchant account credentials), or even a standard telephone. The merchant device may execute an application to interact with the promotion and marketing service 102 and consumer devices 110A-110N. In this regard, the merchant devices 112A-112N may provide electronic marketing information to the promotion and marketing service 102 from the merchant devices 112A-112N in various forms and via various methods. As one example, the merchant devices 112A-112N may provide near real-time resource management data, such inventory information, as purchases are made from the merchant. In other embodiments, the merchant devices 112A-112N may be employed to provide information to the promotion and marketing service 102 to enable the promotion and marketing service 102 to generate promotions, immediate gratification promotions, or other marketing information to be provided to consumers. Similarly, the merchant devices 112A-112N may receive data, such as business analytic data, compensation data, or marketing outreach communications from the promotion and marketing service 102 and/or a consumer device 110A-110N.

As a foundation for some embodiments, the application may prompt the merchant to provide resource management data, which may include the provision of preconfigured promotion thresholds that serve as guideposts during the automatic generation of promotions or immediate gratification promotions by the promotion and marketing service. In some embodiments, the preconfigured promotion thresholds may be entered by a merchant representative using an interface such as that shown in FIG. 2B. For each product or service offered at the merchant location, the merchant representative may manually indicate the largest acceptable discount, and may utilize an interface as shown in FIG. 2B to update these selections at any time. Moreover, the merchant device 112 may harvest electronic marketing information and provide that information to the promotion and marketing service 102 as well. Once the merchant provides access to a particular feature of the merchant device 110, information derived from that feature may in some embodiments be provided to the promotion and marketing service 102 to improve the quality of the merchant's interactions with the promotion and marketing service and/or consumers.

Example Implementing Apparatuses

Each of the consumer devices 110A-110N may be embodied by one or more computing systems, such as apparatus 300 shown in FIG. 3. As illustrated in FIG. 3, the apparatus 300 may include a processor 302, a memory 304, input/output circuitry 306, communications circuitry 308, context collection circuitry 310, and negotiation circuitry 312. The apparatus 300 may be configured to execute the operations described above with respect to FIG. 1 and below with respect to FIG. 7. Although these components 302-314 are described with respect to functional limitations, it should be understood that the particular implementations necessarily include the use of particular hardware. It should also be understood that certain of these components 302-314 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus therefore includes particular hardware configured to perform the functions associated with the particular circuitry described herein.

Of course, while the term "circuitry" should be understood broadly to include hardware, in some embodiments, circuitry may also include software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 302 may provide processing functionality, the memory 304 may provide storage functionality, the communications circuitry 308 may provide network interface functionality, and the like.

In some embodiments, the processor 302 (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium).

The memory 304 may be configured to store information, data, content, applications, instructions, or the like, for enabling the apparatus to carry out various functions in accordance with example embodiments of the present invention.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display that may include a web user interface, a mobile application, a client device, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the apparatus 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Context collection circuitry 310 includes hardware components designed to gather contextual data. These hardware components may, for instance, include one or more sensors (e.g., motion sensors, environmental sensors, position sensors), and may utilize communications circuitry 308 to receive signals and contextual data from remote devices (e.g., other consumer devices, merchant devices, or a promotion and marketing service). Context collection circuitry 310 may further utilize memory 304 or any other memory included in the apparatus 300, to retrieve previously stored contextual data, such as predefined consumer preferences, which may have been received from the user via input/output circuitry 306. Context collection circuitry 310 may further utilize communications circuitry 308 to retrieve contextual data from external sources (e.g., remote databases, remote sensors, or the like). Context collection circuitry 310 may further derive the contextual data regarding the consumer device from other contextual data stored in a memory.

Context collection circuitry 310 may utilize processing circuitry, such as the processor 302, to perform the above operations, and may utilize memory 304 to store the collected contextual data. It should also be appreciated that, in some embodiments, the context collection circuitry 310 may include a separate processor, specially configured field programmable gate array (FPGA), or application specific interface circuit (ASIC) to collect and/or generate the contextual data. The context collection circuitry 310 is therefore implemented using hardware components of the apparatus configured by either hardware or software for implementing these planned functions.

Negotiation circuitry 312 includes hardware configured to generate an indication to purchase a promotion in an instance in which the contextual data regarding the apparatus 300 includes a predefined consumer preference instructing the apparatus to automatically purchase relevant promotions. Negotiation circuitry 312 further includes hardware configured to determine whether the terms of a promotion satisfy triggering criteria included in the predefined consumer preferences. Based on this determination, the negotiation circuitry 312 may develop a request to purchase the promotion, which can be delivered by the communications circuitry to a promotion and marketing service. In one example embodiment, the apparatus 300 may receive a message including terms of a promotion from a promotion and marketing service. If a consumer associated with the apparatus 300 has populated a set of consumer preference selections indicating that the consumer would like the apparatus 300 to purchase items on the consumer's behalf, the negotiation circuitry 312 may evaluate the message received from the promotion and marketing service. Based on the terms of the promotion and triggering criteria that may also be received via the consumer's population of the set of computer preference selections, the negotiation circuitry 312 may determine whether to automatically purchase the promotion, and may initiate transmission of a request to purchase the promotion if appropriate. As alluded to directly above, negotiation circuitry 312 may utilize communications circuitry 308 to transmit and receive messages from a promotion and marketing service (or, when relevant, directly from or to a merchant) on behalf of a consumer associated with the apparatus 300.

It should be appreciated that, in some embodiments, negotiation circuitry 312 may include a separate processor, specially configured field programmable gate array (FPGA), or application specific interface circuit (ASIC) to perform these functions. In such embodiments, negotiation circuitry 312 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It should be understood that while context collection circuitry 310 is described as an element of an apparatus 300, in some embodiments, one or more external systems (such as a promotion and marketing service 102) may also be leveraged to provide at least some of the functionality of this circuitry.

As described above and as will be appreciated based on this disclosure, embodiments of the present invention may be configured as systems, methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The merchant device(s) 112 may be embodied by one or more computing systems, such as apparatus 400 shown in FIG. 4. As illustrated in FIG. 4, the apparatus 400 may include a processor 402, a memory 404, an input/output circuitry 406, and a communications circuitry 408. As it relates to operations described in the present invention, the functioning of the processor 402, the memory 404, the input/output circuitry 306, the communication circuitry 408, and negotiation circuitry 414 may be similar to the similarly named components described above with respect to FIG. 3, and for the sake of brevity, additional description of the mechanics of these components is omitted. Nevertheless, these device elements, operating together, provide the apparatus 400 with the functionality necessary to facilitate the communication of data (e.g., electronic marketing information, business analytic data, or the like) between a consumer, a promotion and marketing service, and the merchant operating the merchant device(s) 112.

Resource management circuitry 410 includes hardware configured to analyze resource management data and identify whether a promotion (e.g., an immediate gratification promotion) would provide a positive return on investment. It should be appreciated that, in some embodiments, resource management circuitry 410 may include a separate processor, specially configured field programmable gate array (FPGA), or application specific interface circuit (ASIC) to perform these functions. Resource management circuitry 410 is therefore implemented using hardware components of the apparatus configured by either hardware or software for implementing these planned functions.

The server device(s) 104 may be embodied by one or more computing systems, such as apparatus 500 shown in FIG. 5. As illustrated in FIG. 5, the apparatus 500 may include a processor 502, a memory 504, an input/output circuitry 506, a communications circuitry 508, and promotion design circuitry 510. As it relates to operations described in the present invention, the functioning of the processor 502, the memory 504, and the circuitry elements may be similar to the similarly named components described above with respect to FIGS. 3 and 4, and for the sake of brevity, additional description of the mechanics of those components is omitted. Nevertheless, these device elements, operating together, provide the apparatus 500 with the functionality necessary to facilitate the communication of data (e.g., electronic marketing information, business analytic data, or the like) between the promotion and marketing service and one or more consumer operation a consumer device 110 and/or merchant operating a merchant device(s) 112.

Design circuitry 510, which is not described in conjunction with either of FIG. 3 or 4 above, includes hardware configured to design an immediate gratification promotion. In this regard, design circuitry 510 may utilize contextual data regarding a set of consumer devices and resource management data regarding a set of merchant locations to design immediate gratification promotions. In addition, design circuitry 510 may further utilize proximity density mapping to evaluate the relevance of promotions or immediate gratification promotions to particular consumer devices. It should be appreciated that, in some embodiments, design circuitry 510 may include a separate processor, specially configured field programmable gate array (FPGA), or application specific interface circuit (ASIC) to perform these functions. Design circuitry 510 is therefore implemented using hardware components of the apparatus configured by either hardware or software for implementing these planned functions.

It should be understood that while design circuitry 510 is described as an element of an apparatus 500, although in some embodiments, one or more external systems may be leveraged to provide at least some of the functionality of this circuitry element.

Having described specific components of an example consumer device (e.g., apparatus 300), an example merchant device (e.g., apparatus 400), and an example promotion and marketing service device (e.g., apparatus 500), an example of a data flow for exchanging electronic information among one or more consumer devices, merchant devices, and the promotion and marketing service is described below with respect to FIG. 6.

Example Service Data Flow

FIG. 6 depicts an example data flow 600 illustrating interactions between a server 602, one or more consumer devices 604, and one or more merchant devices 606. The server 602 may be implemented in the same or a similar fashion as the server 104 as described above in conjunction with FIG. 1, the one or more consumer devices 604 may be implemented in the same or a similar fashion as the consumer devices 110A-110N described above in conjunction with FIG. 1, and the one or more merchant devices 606 may be implemented in the same or a similar fashion as the merchant devices 112A-112N described above in conjunction with FIG. 1.

The data flow 600 illustrates how electronic information may be passed among various systems, in accordance with embodiments of the present invention. The one or more consumer devices 604 and/or one or more merchant devices 606 may provide a variety of electronic marketing information to the server 602 for use in providing promotion and marketing services to the consumer. It should also be appreciated that this electronic marketing information may be collected by the server 602 from a variety of other electronic sources both internal and external to a promotion and marketing service. For example, other data sources may include imported contact databases maintained by merchants, electronic survey questions answered by consumers, and/or various other forms of electronic marketing information. It should be appreciated that this electronic marketing information may include contextual data harvested by the respective one or more consumer devices 604 and/or one or more merchant devices 606. Contextual data received from the one or more consumer devices 604 may be used by the server 602 to identify promotions that are immediately relevant to the consumer. Similarly, contextual data received from the one or more merchant devices 606 may provide insight into consumer behavior that is not be captured directly from consumers.

In addition, the one or more consumer devices 604 may provide promotion purchase messaging to the server 602, enabling the one or more consumer devices 604 to request purchase of promotional content delivered by the promotion and marketing service.

As a result of transactions performed between the one or more consumer devices 604 and the server 602, the server 602 may provide fulfillment data to the consumer devices. The fulfillment data may include information indicating whether a transaction was successful, the location and time a product will be provided to the consumer, instruments for redeeming promotions purchased by the consumer, or the like.

In addition to the e-commerce interactions with the one or more consumer devices 604 offered by the server 602, the server 602 may leverage information provided by the consumer devices 604 to improve the relevance of electronic marketing communications sent to consumers. In this manner, the server 602 may determine promotions, goods, and services that are more likely to be of interest to a particular consumer based on the electronic marketing information provided by and/or relating to the particular consumer. For example, the server 602 may evaluate contextual data (for example, by detecting the location of a consumer based on location data provided by the consumer device, and send electronic marketing communications (e.g., offer promotions) based on, for instance, the proximity of the consumer to the merchant associated with those promotions.

It should also be appreciated that the server 602 may also control other factors of the electronic marketing communications sent to the consumer other than the particular promotions included in the electronic marketing communication. For example, the server 602 may determine the form, structure, frequency, and type of the electronic marketing communication. As with the content of the electronic marketing communication, these factors may be programmatically determined according to various methods, factors, and processes based on electronic marketing information received by the server 602 for the purpose of maximizing the likelihood that the communication will be relevant to the recipient consumer.

The server 402 interactions with the one or more merchant devices 406 may be related to enabling the merchant to market their products using a promotion and marketing service. For example, the one or more merchant devices 406 may provide promotion data defining one or more promotions to be offered by the promotion and marketing service on behalf of the merchant. The server 402 may receive this information and generate information for providing such promotions via an e-commerce interface, making the promotions available for purchase by consumers. The server 402 may also receive resource management data from the one or more merchant devices 406. For example, a merchant may provide electronic marketing information indicating particular products, product prices, inventory levels, and the like to be marketed via a promotion and marketing service. The server 402 may receive this information and generate listing information to offer the indicating products to consumers via a promotion and marketing service.

The one or more merchant devices 406 may also receive information from the server 402. For example, in some embodiments a merchant may obtain access to certain business analytic data aggregated, generated, or maintained by the server 402. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model.

The one or more merchant devices 406 may also receive electronic compensation data from the server 402. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

The one or more merchant devices 406 may also receive outreach communications from the server 402. For example, the promotion and marketing service may communicate with a merchant who offers a product or service for which the promotion and marketing service identifies a potentially beneficial business relationship.

Embodiments described herein advantageously provide improvements to consumer and merchant interaction with the promotion and marketing service by improving the relevance of promotions provided to consumers (e.g., using proximity density mapping) and/or improving the ease with which consumers may purchase and redeem offers (e.g., via immediate gratification promotions). Accordingly, embodiments described herein avoid the bottleneck caused by undue reliance on manual consumer/merchant action.

Example Operations Performed

By a Consumer Device

Having described the circuitry comprising embodiments of the present invention, it should be understood that immediate gratification promotions may advantageously be deployed in a number of ways, described in greater detail below. FIG. 7 broadly illustrates a flowchart containing a series of operations performed by a consumer device to receive, purchase, and redeem an immediate gratification promotion, in accordance with example embodiments described herein. The operations illustrated in FIG. 7 may, for example, be performed by a consumer device 110, with the assistance of, and/or under the control of an apparatus 300.

In operation 702, apparatus 300 includes means, such as input/output circuitry 306, communications circuitry 308, context collection circuitry 310, or the like, for collecting contextual data regarding the consumer device. In this regard, collecting the contextual data may include retrieving the contextual data regarding the consumer device from one or more sensors included in the apparatus, one or more databases included in the apparatus 300, via the input/output circuitry 306 (e.g., by consumer data entry), or via the communications circuitry 308 (e.g., from another device). Additionally or alternatively, collecting the contextual data may include deriving the contextual data regarding the consumer device from other contextual data stored in one or more memory. In this latter regard, the one or more memory may be a local memory included in the apparatus 300 or a remote memory accessed via communications circuitry 308. In any event, the contextual data regarding the consumer device may include at least one of location, velocity, acceleration, angular velocity, direction-of-travel, mode of travel, temperature, humidity, brightness, gravity, orientation, proximity, recorded audio, time of day, day of the week, seasons, country identification, behavioral history, or one or more predefined consumer preferences. The behavioral history may include things such as a purchase history, saved clickstream data, and/or any other interactions received from a consumer device that may be recorded by either the consumer device or the promotion and marketing service. Moreover, behavioral history may access a calendar on the consumer device to identify historical location patterns to predict future availability. The predefined consumer preferences may include things such as dietary restrictions or preferences, preferred times of day, preferred days of the week, price range preferences, or may indicate whether a consumer has selected a "buy for me" preference that authorizes the consumer device (or in some embodiments, the promotion and marketing service itself) to automatically purchase an immediate gratification promotion on behalf of the consumer.

While operation 702 illustrates the collection of contextual data regarding the apparatus 300, it should be understood that consumer may utilize privacy restrictions to limit the type, nature, and extent of the contextual data that is collected. In this regard, the apparatus 300 may further include means, such as input/output circuitry 306, or the like, to receive a set of consumer privacy restrictions. In response to receiving these consumer privacy restrictions, the apparatus 300 may include means, such as context collection circuitry 310, for collecting the contextual data in accordance with the received consumer privacy restrictions.

In operation 704, apparatus 300 includes means, such as communications circuitry 308, or the like, for transmitting the collected contextual data regarding the consumer device to a promotion and marketing service. In this regard, the contextual may be transmitted at periodic intervals (e.g., every minute, every fifteen minutes, every hour, or the like) or in near real-time, such as by transmitting the information every time a change in the contextual data has been made.

It should be understood that when the privacy restrictions may be implemented in operation 702 to throttle the collection of some contextual data regarding the apparatus 300, all of the contextual data that is subsequently collected may be transmitted to the promotion and marketing service. However, in other embodiments contemplated herein, the privacy restrictions may not halt the collection of contextual data, but may simply filter out any collected contextual data that is unauthorized prior to delivery to the promotion and marketing service in operation 704. In such embodiments, operation 704 may further include means, such as processing circuitry, processor 302, communications circuitry 308, or the like, for removing unauthorized contextual data from the collected contextual data prior to transmission of the remaining contextual data to the promotion and marketing service.

In operation 706, apparatus 300 includes means, such as communications circuitry 308, or the like, for receiving, in response to transmitting the collected contextual data regarding the consumer device to the promotion and marketing service, a message indicating terms of an immediate gratification promotion offered by a merchant, wherein the immediate gratification promotion comprises a promotion for which purchase automatically initiates redemption. Generation of the immediate gratification promotion by the promotion and marketing service is described in greater detail below in association with FIG. 9.

Operation 708 illustrates two possible avenues for responding to the received message indicating the terms of the immediate gratification promotion. If a consumer predefines a preference for the apparatus 300 to purchase relevant promotions on the consumer's behalf, then the procedure advances to operation 714. If the consumer has not predefined that preference, then the procedure advances to operation 710.

Turning now to operation 710 (e.g., when the "buy for me" preference is not chosen by the consumer), the apparatus 300 includes means, such as input/output circuitry 306, or the like, for outputting a message identifying the terms of the immediate gratification promotion for review by a consumer. In this regard, outputting the message may occur via a notification tray alert, a notification center message, an in-app message, a multimedia messaging service (MMS) text message, a non-MMS text message, or an email.

It should be understood that in some embodiments, the terms of the immediate gratification promotion may include an expiration date to increase the degree of urgency of the offering, although given the fact that immediate gratification promotions are typically highly location-specific and relevant to a current context of a consumer device, an expiration date may not be necessary for practical purposes.

In response, in optional operation 712, apparatus 300 includes means, such as input/output circuitry 306, or the like, for receiving, in response to outputting the message identifying the terms of the immediate gratification promotion, a request to purchase the immediate gratification promotion. In such situations, the procedure advances to operation 716. Alternatively, however, it is possible that the consumer does not wish to purchase the immediate gratification promotion, or does not respond within a (short) expiration date that may in some embodiments be associated with the immediate gratification promotion. In such cases, no further action is taken.

As an alternative to operation 710, operation 714 occurs when the "buy for me" preference has been chosen by the consumer. In operation 714, apparatus 300 includes means, such as negotiation circuitry 312, or the like, for generating a request to purchase the immediate gratification promotion and for transmitting the request to purchase the immediate gratification promotion to the communications circuitry 308. It should be understood that negotiation circuitry does not necessary transmit a purchase indication of this nature. Rather, in operation 714, the apparatus 300 may include means for determining whether the terms of the immediate gratification promotion satisfy triggering criteria included in the predefined consumer preferences. In such embodiments, the apparatus 300 thus generates the indication to purchase the immediate gratification promotion only in response to determining that the terms of the immediate gratification promotion satisfy the triggering criteria. If the triggering criteria are not satisfied, then the negotiation circuitry 312 does not generate the purchase request.

Assuming a request to purchase the immediate gratification promotion is made by (and regardless of whether it is made by a consumer or by the negotiation circuitry 312), in operation 716 the apparatus 300 includes means, such as communications circuitry 308, or the like, for transmitting a message to the promotion and marketing service to purchase the immediate gratification promotion. As noted elsewhere, purchasing an immediate gratification promotion also initiates redemption of the immediate gratification promotion, so no further action is necessary prior to redemption of the product or service.

Finally, in optional operation 718, the apparatus 300 my include means, such as input/output circuitry 306, communications circuitry 308, or the like, for receiving an indication that preparation of a product or service identified in the immediate gratification promotion is complete, and outputting a message to the consumer indicating that the product or service is ready for redemption. As with the other messages output by the apparatus 300, the input/output circuitry 306 may be configured to output this redemption readiness message via a notification tray alert, a notification center message, an in-app message, a multimedia messaging service (MMS) text message, a non-MMS text message, or an email. Redemption will typically occur at the merchant location, although in some embodiments (e.g., ordering delivery food), redemption may occur at a location specified by the predefined consumer preferences (e.g., a consumer's work or home address). In any event, redeeming the immediate gratification promotion may comprise receiving the promotional product or service. In typical embodiments, no further payment will be necessary, as purchasing the immediate gratification promotion covers the cost of the product or service. However, in some embodiments, the consumer device may be utilized to pay the merchant an additional sum (e.g., a tip). In this regard, in some embodiments, this latter payment may be automated, in which case redemption may comprise receiving the promotional product or service, followed by receiving an indication that the additional sum has been debited from an account associated with the consumer device.

Example Operations Performed

By a Merchant Device

Turning now to FIG. 8, a flowchart illustrates a series of operations performed by a merchant device to enable generation of an immediate gratification promotion and facilitate its redemption, in accordance with example embodiments described herein. It should be understood that while the operations below are not described as being time-limited, in some embodiments, a merchant representative may identify particular times-of-day or time periods during which the merchant location will support immediate gratification promotions, while at other times the merchant location may not support them. The operations illustrated in FIG. 8 may, for example, be performed by a merchant device 112, with the assistance of, and/or under the control of an apparatus 400.

In operation 802, apparatus 400 includes means, such as processor 402, memory 404, input/output circuitry 406, communications circuitry 408, resource management circuitry 410, or the like, for collecting resource management data regarding a merchant location associated with the apparatus 400 (i.e., merchant device). The resource management data regarding the merchant location may include at least one of: product inventory at the merchant location; identification or quantification of fixed, perishable resources (e.g., in a restaurant environment, table availability, inventory, specials available, or the like) at the merchant location; or one or more discount thresholds regarding one or more products or services offered for sale at the merchant location. In some embodiments, the one or more discount thresholds may be received (or may have previously been received) from a merchant representative via input/output circuitry 406 or from another device via communications circuitry 408. It should be understood that the apparatus may retrieve the resource management data regarding the consumer device from one or more memories included in the apparatus or located externally to the apparatus. Additionally or alternatively, the apparatus may receive the resource management data from a user (e.g., via input/output circuitry 406).

In operation 804, apparatus 400 includes means, such as communications circuitry 408, or the like, for transmitting the collected resource management data regarding the merchant location to a promotion and marketing service. In this regard, it should be understood that the resource management data may be transmitted at periodic intervals (e.g., every minute, every fifteen minutes, every half-hour, every hour, or the like), or, in near real-time, such as by transmitting the information every time a change in the resource management data has been identified.

In operation 806, apparatus 400 includes means, such as communications circuitry 408, or the like, for receiving a message from the promotion and marketing service indicating terms of an immediate gratification promotion purchased by a consumer for redemption at the merchant location, wherein the immediate gratification promotion comprises a promotion for which purchase automatically initiates redemption. It should be understood that the immediate gratification promotion may be generated based on collected contextual data regarding the consumer device and the collected resource management data regarding the merchant location. Generation of the immediate gratification promotion is described below in connection with FIG. 9.

In operation 808, apparatus 400 includes means, such as input/output circuitry 406, or the like, for outputting a message identifying the terms of the immediate gratification promotion. In this regard, the apparatus may deliver the message via a notification tray alert, a notification center message, an in-app message, a multimedia messaging service (MMS) text message, a non-MMS text message, or an email.

In operation 810, apparatus 400 includes means, such as input/output circuitry 406, communications circuitry 408, or the like, for receiving an indication that a product or service purchased via the immediate gratification promotion is ready for redemption. This indication may be received from a merchant representative at the merchant location (e.g., by a restaurant employee that has just packaged a lunch meal for pickup).

In operation 812, apparatus 400 includes means, such as communications circuitry 408, or the like, for transmitting, in response to receiving the indication that the product or service purchased via the immediate gratification promotion is ready for redemption, a message indicating that the purchased product or service is ready for redemption. This message may be transmitted to the promotion and marketing service, which in turn transmits a similar message to a consumer device. Alternatively, this message may be transmitted to the consumer device directly by the apparatus 400.

Example Operations Performed

By the Promotion and Marketing Service

Turning now to FIG. 9, a flowchart illustrates a series of operations performed by a promotion and marketing system to generate, deliver, and facilitated redemption of an immediate gratification promotion, in accordance with example embodiments described herein. The operations illustrated in FIG. 9 may, for example, be performed by a promotion and marketing service 102, with the assistance of, and/or under the control of an apparatus 500.

In operation 902, apparatus 500 includes means, such as processor 502, memory 504, input/output circuitry 506, communications circuitry 508, design circuitry 510, or the like, for receiving contextual data regarding a set of consumer devices. In this regard, the contextual data regarding the set of consumer devices may include at least one of location, velocity, acceleration, angular velocity, direction-of-travel, mode of travel, temperature, humidity, brightness, gravity, orientation, proximity, recorded audio, time of day, day of the week, seasons, country identification, behavioral history, or one or more predefined consumer preferences, as described previously. The contextual data may be received periodically or in near real-time, as also described previously.

In operation 904, apparatus 500 includes means, such as communications circuitry 508, or the like, for receiving resource management data regarding a set of merchant locations. In this regard, the resource management data regarding the set of merchant locations may include at least one of: product inventory at the merchant location; identification or quantification of fixed, perishable resources at the merchant location; or one or more discount thresholds regarding one or more products or services offered for sale at the merchant location. As with the contextual data, the resource management data may be received periodically from each merchant location or in near real-time.

In operation 906, apparatus 500 includes means, such as processor 502, design circuitry 510, or the like, for identifying a consumer device and a merchant location to match with an immediate gratification promotion. In this regard, identification of the counterparties may begin either from an analysis of each consumer device in the set of consumer devices, or from an analysis of each merchant location in the set of merchant locations.

In some embodiments, identifying the consumer device and the merchant location begins by iteratively analyzing each of the merchant locations, thus identifying consumer devices that are relevant to each merchant location as that merchant location is analyzed. For instance, the design circuitry 510 may identify the consumer device and the merchant location by determining a physical region associated with each particular merchant location of the set of merchant locations that indicates an area within which consumers are likely to purchase immediate gratification promotions redeemable at that particular merchant location. The design circuitry 510 may then establish a geo-fence associated with each merchant location of the set of merchant locations, wherein each geo-fence comprises a virtual perimeter enclosing the determined physical region associated with a corresponding merchant location. Finally, the design circuitry 510 may identify, from the received contextual data, a subset of consumer devices that are located within the geo-fence associated with the merchant location, and then select the consumer device from the subset of consumer devices that are located within the geo-fence. In some such embodiments, selecting the consumer device includes extracting contextual data regarding the consumer device from the received contextual data; and determining, based on the contextual data regarding the consumer device, that the consumer would likely want a product or service offered by the merchant location.

It should be understood that determining the physical region around the merchant location within which consumers are likely to purchase immediate gratification promotions relating to the merchant location can be accomplished in several ways. For instance, determining the physical region may include identifying, using a historical database, purchase locations from which consumer devices have previously purchased immediate gratification promotions redeemable at the merchant location, and defining the physical region around the merchant location as an area enclosing all of the identified purchase locations. Alternatively, determining the physical region may include defining the physical region around the merchant location based on physical regions established for similarly situated merchant locations. Finally, determining the physical region may include receiving an indication of the physical region around the merchant location from a merchant device associated with the merchant location.

Other embodiments for identifying the consumer device and the merchant location begin by iteratively analyzing each of the consumer devices, thus identifying merchant locations for each consumer device as that consumer device is analyzed. For instance, the design circuitry 510 may identify the consumer device and the merchant location by first determining a physical region associated which each particular consumer device of the set of consumer devices that indicates an area within which that particular consumer device is likely to redeem immediate gratification promotions. The design circuitry 510 may then, for the consumer device, identify a subset of merchant locations that are within the determined physical region associated with the consumer device, and select the merchant location from the subset of merchant locations that are within the determined physical region associated with the consumer device.

In operation 908, apparatus 500 includes means, such as processor 502, design circuitry 510, or the like, for generating the terms of an immediate gratification promotion based on the received contextual data and the received resource management data. In some embodiments, generating the terms of the immediate gratification promotion includes extracting contextual data regarding the consumer device from the received contextual data and extracting resource management data regarding the merchant location from the received resource management data. In such embodiments, generating the terms of the immediate gratification promotion further includes determining, based on the context contextual data regarding the consumer device and the resource management data regarding the merchant location, a product or service to include in the immediate gratification promotion, retrieving a set of promotions offered by the merchant location, and selecting, based on the product or service to include in the immediate gratification promotion and the set of promotions offered by the merchant location, a cost to purchase the immediate gratification promotion, wherein the cost to purchase the immediate gratification promotion includes a value to be retained by a merchant associated with the merchant location and a value to be retained by a promotion and marketing service.

It should be understood that the determination of whether to generate and/or deliver an immediate gratification promotion may depend on additional factors. In this regard, in some embodiments, the best possible immediate gratification promotion is identified and selected for delivery. However, in alternatively embodiments, if the best possible immediate gratification promotion is not sufficiently relevant, then no immediate gratification promotion may be delivered at all. To this latter point, the promotion and marketing service may assign a relevance score to each immediate gratification promotion, wherein the relevance score is based on intensity of the predicted consumer demand, calculated using the contextual data received from the identified consumer device and the intensity of the merchant need, as calculated using the resource management data received from the identified merchant location. In some embodiments, the determination of whether this relevance score is sufficient to deliver the immediate gratification promotion may be based on the predefined consumer preferences (e.g., a consumer may select the relevance threshold), although in other embodiments, the merchant may be able to select the threshold, or in yet other embodiments, the promotion and marketing service itself may assign a minimum relevance score required before it will deliver an immediate gratification promotion.

In operation 910, apparatus 500 includes means, such communications circuitry 508 or the like, for transmitting, to the consumer device, a message indicating terms of an immediate gratification promotion redeemable at a merchant location of the set of merchant locations, wherein the immediate gratification promotion comprises a promotion for which purchase automatically initiates redemption Optionally, in operation 912, apparatus 500 includes means, such as communications circuitry 508, or the like, for receiving, from the consumer device, a message requesting purchase of the immediate gratification promotion. As noted above, purchasing an immediate gratification promotion also initiates redemption of the immediate gratification promotion, so no further messages are needed to process the immediate gratification promotion and initiate redemption of the product or service. Of course, in response to receiving this message, operation 912 may further include means, such as communications circuitry 508 or the like, for conveying the terms of the purchased immediate gratification promotion to the merchant location responsible for redemption.

In optional operation 914, apparatus 500 includes means, such as processor 502 or the like, for processing payment for the immediate gratification promotion in response to receiving the message requesting purchase of the immediate gratification promotion. In some embodiments, processing payment for the immediate gratification promotion includes debiting an account associated with the consumer device, and causing the communications circuitry to transmit a message to the consumer device indicating that payment has been debited from an account associated with the consumer.

Finally, in optional operation 916, apparatus 500 includes means, such as communications circuitry 508 or the like, for receiving a message indicating that a product or service identified in the immediate gratification promotion is ready for redemption; and transmitting the message indicating that the product or service is ready for redemption to the consumer device.

Turning now to FIG. 10, a flowchart illustrates a series of operations performed by the promotion and marketing service to optimize selection of promotions to deliver to consumers based on proximity density mapping, in accordance with example embodiments described herein. While optimization of promotion selection based on proximity density mapping is described below in connection with selection of promotions to provide to consumers, it should be understood that the optimization of promotion selection based on proximity density mapping may in some embodiments be utilized in conjunction with the generation and delivery of immediate gratification promotions described above in connection with FIG. 9. The operations illustrated in FIG. 10 may, for example, be performed by a promotion and marketing service 102, with the assistance of, and/or under the control of an apparatus 500.

In operation 1002, apparatus 500 includes means, such as input/output circuitry 506, communications circuitry 508, or the like, for receiving contextual data regarding a consumer device. It should be understood that this contextual data may be classified into two sub-categories of data: geographical indicators and preferential indicators. In this regard, the geographical indicators contained within the contextual data regarding the set of consumer devices may comprise at least one of location, velocity, acceleration, angular velocity, direction-of-travel, mode of travel, or behavioral history. Similarly, the preferential indicators contained within the contextual data regarding the set of consumer devices may include at least one of temperature, humidity, brightness, gravity, orientation, recorded audio, time of day, day of the week, seasons, country identification, behavioral history, or one or more predefined consumer preferences.

In operation 1004, apparatus 500 includes means, such as processor 502, design circuitry 510, or the like, for identifying a geographical area for redemption based on geographical indicators contained within the received contextual data regarding the consumer device. In some embodiments, operation 1004 includes deducing a location of the consumer device based on the geographical indicators contained within the received contextual data, determining one or more time periods during which a consumer is statistically most likely to redeem a promotion, and identifying a region, based on the geographical indicators contained within the received contextual data, within which the consumer device is expected to be located in the one or more time periods. In such embodiments, the geographical area for redemption comprises the identified region. It should be understood that the region within which the consumer device is expected to be located may be based on additional contextual data, as well. For instance, behavioral history of the consumer device may be used to identify this region. The behavioral history may include things such as a purchase history, saved clickstream data, and/or any other interactions received from a consumer device that may be recorded by either the consumer device or the promotion and marketing service. Moreover, behavioral history may access a calendar on the consumer device to identify historical patterns that can predict future location. The predefined consumer preferences may include information regarding predefined relevant locations (e.g., a "home" location, a "work" location or the like) that may further be used to identify the region within which a consumer device may be expected to be located.

In operation 1006, apparatus 500 includes means, such as memory 504, communications circuitry 508, design circuitry 510, or the like, for retrieving a set of promotions related to the geographical area for redemption and to preferential indicators contained within the contextual data regarding the consumer device. In this regard, promotions related to a geographical area may comprise those promotions redeemable at merchant locations within the geographical area, or those promotions having some substantive relationship with the geographical area (e.g., Grand Canyon merchandise, if the geographical area includes or abuts the Grand Canyon).

In operation 1008, apparatus 500 includes means, such as processor 502, design circuitry 510, or the like, for determining a proximity density mapping of each promotion within the retrieved set of promotions. One example procedure for determining a proximity density mapping of a promotion is described below in conjunction with FIG. 11.

In operation 1010, apparatus 500 includes means, such as design circuitry 510 or the like, for selecting the promotion from the set of retrieved promotions based on a comparison of the determined proximity density mapping of the promotion to the proximity density mappings of the other promotions in the set of retrieved promotions. In this regard, it should be understood that in some embodiments, this operation comprises selecting the promotion in response to determining that the proximity density mapping of the promotion is larger than the proximity density mapping of the other promotions in the set of retrieved promotions.

In operation 1012, apparatus 500 includes means, such as communications circuitry 508 or the like, for transmitting, to the consumer device, a message indicating terms of a promotion redeemable at a merchant location.

Optionally, in operation 1014, apparatus 500 includes means, such as communications circuitry 508, or the like, for receiving, from the consumer device, a message requesting purchase of the promotion.

Finally, in optional operation 1016, apparatus 500 includes means, such as processor 502 or the like, for processing payment for the promotion in response to receiving the message requesting purchase of the promotion. In some embodiments, processing payment for the promotion includes debiting an account associated with the consumer device, and causing the communications circuitry to transmit a message to the consumer device indicating that payment has been debited from an account associated with the consumer.

Turning now to FIG. 11, a flowchart illustrates a series of operations performed by the promotion and marketing service to determine a proximity density mapping for a promotion, in accordance with example embodiments described herein. The operations illustrated in FIG. 11 may, for example, be performed by a promotion and marketing service 102, with the assistance of, and/or under the control of an apparatus 500.

In operation 1102, apparatus 500 includes means, such as processor 502, design circuitry 510, or the like, for determining a promotion category of the promotion. In this regard, the promotion may be categorized in a number of different ways. For instance, the promotion may be categorized based on the product or service it promotes (e.g., a promotion for a deep tissue massage may be classified with a promotion for a Swedish massage, but not with a promotion for a facial). Alternatively, the promotion may be categorized by a merchant class offering the promotion (e.g., a promotion for a deep tissue massage may be classified with a promotion for a facial offered by the same merchant). Still further, the promotion may be categorized by the type of benefit it offers, by the structure of the promotion, or by any other promotion categorization mechanism that may be known in the industry.

In operation 1104, apparatus 500 includes means, such as processor 502, design circuitry 510, or the like, for calculating a proximity density of the determined promotion category in the geographical area. It should be understood that the proximity density of the determined promotion category in the geographical area comprises a number of promotions in the geographical area that are within the determined promotion category.

In operation 1106, apparatus 500 includes means, such as processor 502, design circuitry 510, or the like, for dividing the calculated proximity density by an average proximity density of the promotion category in regions that are similar to the geographical area. In this regard, the proximity density mapping of the promotion comprises the quotient produced by dividing the calculated proximity density by an average proximity density of the promotion category in similar regions to the geographical area. It should be understood that identification of regions that are similar to the geographical area may vary in a number of ways. For instance, similar regions may in some situations comprise regions having similar areas. Alternatively, similar regions may comprise regions that have similar populations. Yet further, similar regions may comprise regions that are nearby (versus those that are located in different states, countries, continents, or the like). Other similarity metrics may also be considered for this purpose. It should be understood that identifying similar regions to the geographical area may utilize a (possibly weighted) combination of these bases to identify the regions that are similar to the geographical area.

FIGS. 7-11 illustrate flowcharts of the operation of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

Accordingly, blocks of the flowcharts support combinations of means for performing the specified functions and combinations of operations for performing the specified functions. It will be understood that one or more blocks of the flowcharts, and combinations of blocks in the flowcharts, can be implemented by special purpose hardware-based computer systems which preform the specified functions, or combinations of special purpose hardware and computer instructions.

In some embodiments, certain ones of the operations above may be modified or further amplified. Furthermore, in some embodiments, additional optional operations may be included. Modifications, amplifications, or additions to the operations above may be performed in any order and in any combination.

Example Scenario

Consider the following example scenario, employing an embodiment of the present invention. Gil leaves his office after a meeting at 1:30 pm. He is hungry and a bit frazzled, but knows he needs to get something to eat quickly before his next meeting at 2 pm. As he exits his office building, his consumer device transmits contextual data to a promotion and marketing service. This contextual data includes an indication of his location, and may also indicate his velocity, acceleration, angular velocity, direction-of-travel, or mode of travel. Similarly, this contextual data may include environmental factors, such as the temperature, humidity, brightness, gravity, orientation, proximity, recorded audio, time of day, day of the week, seasons, country identification, and/or behavioral history. Finally, the contextual data may include one or more predefined consumer preferences that Gil had entered previously regarding when and what type of promotions hey would be interested in.

In response to receiving this contextual data, the promotion and marketing service can do one of two things. In some embodiments, the promotion and marketing service may determine whether Gil has entered a geo-fence that had been previously established for a merchant location. In other embodiments, the promotion and marketing service may identify a set of merchant locations that are within a physical region associated which Gil's consumer device that indicates an area within which Gil is likely to redeem an immediate gratification promotion. Using either method, the promotion and marketing service thus uses the contextual data from Gil's device to identify a restaurant that is relevant to Gil's current situation. Then, based on the context contextual data received from Gil and resource management data regarding the restaurant, the promotion and marketing service generates an immediate gratification promotion to offer to Gil. In this regard, based on Gil's prior purchase history and predefined consumer preferences, the promotion and marketing service selects a gluten free, vegetarian option.

From Gil's perspective, as he exits the office building, he gets a text message notification from the promotion and marketing service. The text provides a message identifying terms of the immediate gratification promotion. In this case, as illustrated in FIG. 12A, the message offers Gil a 15% discount on a particular tofu dish.

Gil likes the offer, and responds "YES" to the text message. In response, the promotion and marketing service forwards the terms of the immediate gratification promotion to the merchant location and processes payment for the immediate gratification promotion automatically (e.g., by debiting a predefined account Gil has provided to the promotion and marketing service). Subsequently, as shown in FIG. 12B, Gil receives a notification from the promotion and marketing service confirming that his order has been placed, and that it will be ready in 10 minutes.

When Gil's order is ready, he gets a text message confirming that it is ready for pick-up, as illustrated in FIG. 12C.

Gil likes this experience for a number of reasons. It is relevant: the immediate gratification promotion provides an offer that is tailored to his preferences (gluten free, vegetarian, etc.). It is fast: the offer format does not saturate Gil with a ton of mediocre choices, but instead highlights one GREAT choice (one meal from one merchant). It is easy: Gil was able to purchase and initiate redemption of the immediate gratification promotion simply replying "YES" automatically places an order and uses the credit card that Gil has on file at Groupon. Finally, it offers customization. As illustrated in FIG. 12A, even if Gil didn't like the offer, he could see other options which were live at that point for this location.

As described above, certain example embodiments of the present invention are directed to improved apparatuses, methods, and computer readable media that enable generation and utilization of highly relevant immediate gratification promotions. By collecting contextual data regarding consumer devices and resource management data regarding merchant locations, a promotion and marketing service can identify and issue just-in-time and relevant recommendations that will benefit both consumers having a need in the market and merchants looking to increase revenue.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one memory and at least one processor, the at least one memory having computer-coded instructions stored thereon that, in execution with the at least one processor, configure the apparatus to:
    receive contextual data associated with a consumer device, wherein the contextual data comprises data indicative of at least one user-associated location;
    determine a first merchant location set corresponding to at least one merchant location where the consumer device is likely to redeem promotions based at least in part on the at least one user-associated location;
    generate a merchant-associated physical region for each merchant location of at least a portion of the first merchant location set, wherein at least a first merchant-associated physical region associated with a first merchant location is generated comprising a geofence defined based at least in part on a second set of merchant locations determined to be similar to the first merchant location;

determine a real-time location associated with the consumer device is within the merchant-associated physical region associated with each merchant location of at least a subset of the first merchant location set;

receive, via at least one merchant device associated with the subset of the first merchant location set, resource data associated with the subset of the first merchant location set;

determine, based at least in part on one or more of the contextual data and the resource data, an immediate gratification promotion set corresponding to the subset of the first merchant location set;

generate a relevance score for each immediate gratification promotion in the immediate gratification promotion set, each relevance score generated based at least in part on one or more of the contextual data, the resource data, and electronic marketing information associated with a user account corresponding to the consumer device;

determine the relevance score for a selected immediate gratification promotion of the immediate gratification promotion set satisfies a relevance threshold, the selected immediate gratification promotion associated with a respective merchant location the subset of the first merchant location set, wherein the selected immediate gratification promotion comprises a promotion for which purchase automatically initiates redemption;

transmit, to the consumer device, an impression of the selected immediate gratification promotion in response to determination that the real-time location associated with the consumer device is within the merchant-associated physical region associated with the respective merchant location; and initiate redemption of the selected immediate gratification promotion in response to engagement with the impression of the selected immediate gratification promotion.

2. The apparatus according to claim 1, the apparatus further configured to:
determine the relevance threshold, wherein the relevance threshold comprises a minimum relevance score satisfied by the relevance score for the selected immediate gratification promotion.

3. The apparatus according to claim 1, the apparatus further configured to:
assign the relevance threshold based on received consumer input data embodying the relevance threshold.

4. The apparatus according to claim 1, the apparatus further configured to:
assign the relevance threshold for the selected immediate gratification promotion based on received merchant input data embodying the relevance threshold, the merchant input data received from a merchant device associated with the selected immediate gratification promotion.

5. The apparatus according to claim 1, wherein to determine the immediate gratification promotion set corresponding to the subset of the first merchant location set the apparatus is configured to:
determine, for at least a first merchant location in the subset of the first merchant location set and based at least in part on the contextual data and the resource management data, a product or a service associated with the first merchant location for including in at least a first immediate gratification promotion of the immediate gratification promotion set;

retrieve a set of promotions associated with the first merchant location;

select, based on the product or the service and the set of promotions associated with the first merchant location, an immediate promotion cost value; and include the first immediate gratification promotion in the immediate gratification promotion set, the first immediate gratification promotion comprising the immediate promotion cost value.

6. The apparatus according to claim 1, wherein to generate the relevance score for each immediate gratification promotion in the immediate gratification promotions set, the apparatus is configured to:
for each immediate gratification promotion in the immediate gratification promotions set, generate a predicted demand value associated with the immediate gratification promotion, wherein the relevance score for the immediate gratification promotion is generated based on the predicted demand value.

7. The apparatus according to claim 1, the apparatus further configured to:
for each particular merchant location in the subset of the first merchant location set, cause a merchant device of the at least one merchant device to provide at least a portion of the resource data, wherein the merchant device is associated with the particular merchant location, and wherein the portion of the resource data is associated with the particular merchant location, wherein the portion of the resource data associated with the particular merchant location defines at least one determined promotion threshold for the particular merchant location, and wherein to determine the immediate gratification promotion set, the apparatus is configured to at least:
generate first terms for a first immediate gratification promotion associated with the particular merchant location, wherein the first terms are generated to satisfy the at least one determined promotion threshold embodied in the portion of the resource data associated with the particular location.

8. The apparatus according to claim 1, the apparatus further configured to:
determine, based at least in part on the contextual data, the consumer device is located within a first merchant-associated physical region associated with the respective merchant location.

9. The apparatus according to claim 1, the apparatus further configured to:
determine a target geographical location based on the contextual data; and identify each immediate gratification promotion in the immediate gratification promotion set is associated with a redemption location proximate to the target geographical location or is associated with data indicating a relationship with the target geographical location.

10. The apparatus according to claim 1, the apparatus further configured to:
generate the at least one merchant-associated physical region encompassing the at least one user-associated location.

11. The apparatus according to claim 1, the apparatus further configured to:
  generate at least one at least one user-associated physical region associated with the consumer device, the at least one user-associated physical region defined based at least in part on the at least one user-associated location; and
  select the first merchant location set comprising, from a possible merchant location set, at least one merchant location within the at least one user-associated physical region.

12. A computer-implemented method comprising:
  receiving contextual data associated with a consumer device, wherein the contextual data comprises data indicative of at least one user-associated location;
  determine a first merchant location set corresponding to at least one merchant location where the consumer device is likely to redeem promotions based at least in part on the at least one user-associated location;
  generate a merchant-associated physical region for each merchant location of at least a portion of the first merchant location set, wherein at least a first merchant-associated physical region associated with a first merchant location is generated comprising a geofence defined based at least in part on a second set of merchant locations determined to be similar to the first merchant location;
  determining a real-time location associated with the consumer device is within the merchant-associated physical region associated with each merchant location of at least a subset of the first merchant location set;
  receiving, via at least one merchant device associated with the subset of the first merchant location set, resource data associated with the subset of the first merchant location set;
  determining, based at least in part on one or more of the contextual data and the resource data, an immediate gratification promotion set corresponding to the subset of the first merchant location set;
  generating a relevance score for each immediate gratification promotion in the immediate gratification promotion set, each relevance score generated based at least in part on one or more of the contextual data, the resource data, and electronic marketing information associated with a user account corresponding to the consumer device;
  determining the relevance score for a selected immediate gratification promotion of the immediate gratification promotion set satisfies a relevance threshold, the selected immediate gratification promotion associated with a respective merchant location the subset of the first merchant location set,
  wherein the selected immediate gratification promotion comprises a promotion for which purchase automatically initiates redemption;
  transmitting, to the consumer device, an impression of the selected immediate gratification promotion in response to determination that the real-time location associated with the consumer device is within the merchant-associated physical region associated with the respective merchant location; and
  initiating redemption of the selected immediate gratification promotion in response to engagement with the impression of the selected immediate gratification promotion.

13. The computer-implemented method according to claim 12, the computer-implemented method further comprising:
  determining the relevance threshold, wherein the relevance threshold comprises a minimum relevance score satisfied by the relevance score for the selected immediate gratification promotion.

14. The computer-implemented method according to claim 12, the computer-implemented method further comprising:
  assign the relevance threshold based on received consumer input data embodying the relevance threshold.

15. The computer-implemented method according to claim 12, the computer-implemented method further comprising:
  assign the relevance threshold for the selected immediate gratification promotion based on received merchant input data embodying the relevance threshold, the merchant input data received from a merchant device associated with the selected immediate gratification promotion.

16. The computer-implemented method according to claim 12, wherein determining the immediate gratification promotion set corresponding to the subset of the first merchant location set comprises:
  determining, for at least a first merchant location in the subset of the first merchant location set and based at least in part on the contextual data and the resource management data, a product or a service associated with the first merchant location for including in at least a first immediate gratification promotion of the immediate gratification promotion set;
  retrieving a set of promotions associated with the first merchant location;
  selecting, based on the product or the service and the set of promotions associated with the first merchant location, an immediate promotion cost value; and
  including the first immediate gratification promotion in the immediate gratification promotion set, the first immediate gratification promotion comprising the immediate promotion cost value.

17. The computer-implemented method according to claim 12, wherein generating the relevance score for each immediate gratification promotion in the immediate gratification promotions set comprises:
  for each immediate gratification promotion in the immediate gratification promotions set, generating a predicted demand value associated with the immediate gratification promotion, wherein the relevance score for the immediate gratification promotion is generated based on the predicted demand value.

18. The computer-implemented method according to claim 12, the computer-implemented method further comprising:
  for each particular merchant location of the subset of the first merchant location set, causing a merchant device associated with the particular merchant location to provide at least a portion of the resource data, the portion of the resource data associated with the particular merchant location,
  wherein the portion of the resource data associated with the particular merchant location defines at least one determined promotion threshold for the particular merchant location, and
  wherein determining the immediate gratification promotion set comprises:

generating first terms for a first immediate gratification promotion associated with the particular merchant location, wherein the first terms are generated to satisfy the at least one determined promotion threshold embodied in the portion of the resource data associated with the particular location.

19. A computer program product comprising at least one non-transitory computer-readable storage medium having computer program code thereon that is configured, in execution with at least one processor, for:

receiving contextual data associated with a consumer device, wherein the contextual data comprises data indicative of at least one user-associated location;

determining a first merchant location set corresponding to at least one merchant location where the consumer device is likely to redeem promotions based at least in part on the at least one user-associated location;

generating a merchant-associated physical region for each merchant location of at least a portion of the first merchant location set, wherein at least a first merchant-associated physical region associated with a first merchant location is generated comprising a geofence defined based at least in part on a second set of merchant locations determined to be similar to the first merchant location;

determining a real-time location associated with the consumer device is within the merchant-associated physical region associated with each merchant location of at least a subset of the first merchant location set;

receiving, via at least one merchant device associated with the subset of the first merchant location set, resource data associated with the subset of the first merchant location set;

determining, based at least in part on one or more of the contextual data and the resource data, an immediate gratification promotion set corresponding to the subset of the first merchant location set;

generating a relevance score for each immediate gratification promotion in the immediate gratification promotion set, each relevance score generated based at least in part on one or more of the contextual data, the resource data, and electronic marketing information associated with a user account corresponding to the consumer device;

determining the relevance score for a selected immediate gratification promotion of the immediate gratification promotion set satisfies a relevance threshold, the selected immediate gratification promotion associated with a respective merchant location the subset of the first merchant location set, wherein the selected immediate gratification promotion comprises a promotion for which purchase automatically initiates redemption;

transmitting, to the consumer device, an impression of the selected immediate gratification promotion in response to determination that the real-time location associated with the consumer device is within the merchant-associated physical region associated with the respective merchant location; and initiating redemption of the selected immediate gratification promotion in response to engagement with the impression of the selected immediate gratification promotion.

20. The computer program product according to claim 19, the computer program product further configured for:

for each particular merchant location of the subset of the first merchant location set, causing a merchant device associated with the particular merchant location to provide at least a portion of the resource data, the portion of the resource data associated with the particular merchant location, wherein the portion of the resource data associated with the particular merchant location defines at least one determined promotion threshold for the particular merchant location, and wherein determining the immediate gratification promotion set comprises:

generating first terms for a first immediate gratification promotion associated with the particular merchant location, wherein the first terms are generated to satisfy the at least one determined promotion threshold embodied in the portion of the resource data associated with the particular location.

* * * * *